(12) United States Patent
Sugawara (10) Patent No.: US 8,722,828 B2
(45) Date of Patent: May 13, 2014

(54) PROCESS FOR CONTINUOUS PRODUCTION OF CYCLOOLEFIN RESINS, AND SHEETS OR FILMS THEREOF, USING RING OPENING METATHESIS POLYMERIZATION

(75) Inventor: Tomoo Sugawara, Tokyo (JP)

(73) Assignee: Zeon Corporation, Tokyo (JP)

(*) Notice: Subject to any disclaimer, the term of this patent is extended or adjusted under 35 U.S.C. 154(b) by 1002 days.

(21) Appl. No.: 10/544,005

(22) PCT Filed: Feb. 2, 2004

(86) PCT No.: PCT/JP2004/000988
§ 371 (c)(1),
(2), (4) Date: May 24, 2006

(87) PCT Pub. No.: WO2004/069895
PCT Pub. Date: Aug. 19, 2004

(65) Prior Publication Data
US 2007/0037946 A1 Feb. 15, 2007

(30) Foreign Application Priority Data

Jan. 31, 2003 (JP) ................. 2003-023659
Feb. 28, 2003 (JP) ................. 2003-052603

(51) Int. Cl.
| | |
|---|---|
| C08F 36/20 | (2006.01) |
| C08F 4/80 | (2006.01) |
| C08F 2/02 | (2006.01) |
| C08F 2/40 | (2006.01) |
| C08L 45/00 | (2006.01) |
| C08L 47/00 | (2006.01) |

(52) U.S. Cl.
USPC ...... 526/282; 427/420; 427/428.01; 428/441; 526/171; 526/190; 526/204; 526/217; 526/227; 526/230.5; 526/280; 526/281; 526/283; 526/336

(58) Field of Classification Search
None
See application file for complete search history.

(56) References Cited

U.S. PATENT DOCUMENTS 4,520,181 A * 5/1985 Klosiewicz ............... 525/247
4,708,969 A * 11/1987 Leach ....................... 521/82

(Continued)

FOREIGN PATENT DOCUMENTS

| EP | 1535941 A1 | 6/2005 |
| JP | 5-70655 A | 3/1993 |

(Continued)

OTHER PUBLICATIONS

Supplementary European Search Report dated Apr. 19, 2010 for European Application No. 04707284.

*Primary Examiner* — Richard A Huhn
(74) *Attorney, Agent, or Firm* — Birch, Stewart, Kolasch & Birch, LLP (57) ABSTRACT

A process (1) for producing a cycloolefin resin film comprising the steps of: the step (I) of mixing a cycloolefin monomer and a metathesis polymerization catalyst to prepare a polymerizable composition (A); the step (II) of coating or impregnating the supporting body with the polymerizable composition (A) at once after the step (I), and the step (III) of polymerizing the polymerizable composition (A) by polymerization; and a process (2) for producing a cycloolefin polymer sheet or film with the thickness of 1 mm or less comprising polymerizing a reactive solution containing a ruthenium complex catalyst, having a hetero atom-containing carbene compound as a ligand, and a cycloolefin monomer by ring-opening metathesis bulk polymerization, wherein the polymerization of the cycloolefin monomer is completed by heating the reactive solution to 100° C. or higher at the heating rate of 20° C./min or more. Thus, a cycloolefin resin film having excellent adhesion to other materials and a cycloolefin polymer sheet or film having a thickness of 1 mm or can be efficiently produced.

10 Claims, 1 Drawing Sheet

(56) References Cited

U.S. PATENT DOCUMENTS

| | | | |
|---|---|---|---|
| 5,160,772 A * | 11/1992 | Futami et al. | 428/71 |
| 5,463,002 A * | 10/1995 | Sugawara et al. | 526/161 |
| 5,585,510 A * | 12/1996 | Mazany | 556/20 |
| 5,728,785 A * | 3/1998 | Grubbs et al. | 526/142 |
| 5,766,699 A * | 6/1998 | Ohtsuki et al. | 428/1.54 |
| 5,840,238 A * | 11/1998 | Setiabudi et al. | 264/331.17 |
| 5,902,654 A * | 5/1999 | Davidson et al. | 428/35.1 |
| 6,020,443 A * | 2/2000 | Woodson et al. | 526/135 |
| 6,162,883 A * | 12/2000 | Muhlebach et al. | 526/118 |
| 6,235,849 B1 * | 5/2001 | Jayaraman et al. | 525/326.7 |
| 6,235,856 B1 * | 5/2001 | Hafner et al. | 526/171 |
| 6,407,190 B1 * | 6/2002 | Van Der Schaaf et al. | 526/171 |
| 6,436,476 B1 * | 8/2002 | Sage, Jr. | 427/359 |
| 6,759,537 B2 * | 7/2004 | Grubbs et al. | 548/101 |
| 6,838,489 B2 * | 1/2005 | Bell et al. | 522/63 |
| 2002/0015519 A1 * | 2/2002 | Tokas et al. | 382/147 |
| 2002/0111446 A1 * | 8/2002 | Mukerjee et al. | 526/169 |
| 2002/0153096 A1 * | 10/2002 | Giardello et al. | 156/334 |
| 2003/0058812 A1 * | 3/2003 | Kendall et al. | 370/322 |
| 2008/0125531 A1 * | 5/2008 | Sugawara | 524/384 |
| 2009/0036614 A1 | 2/2009 | Sugawara | |

FOREIGN PATENT DOCUMENTS

| | | | | |
|---|---|---|---|---|
| JP | 5-148413 A | 6/1993 | | |
| JP | 6-298956 A | 10/1994 | | |
| JP | 10-101907 A | 4/1998 | | |
| JP | 10-139865 A | 5/1998 | | |
| JP | 2000-327756 A | 11/2000 | | |
| JP | 2000-336152 A | 12/2000 | | |
| JP | 2001-253934 A | 9/2001 | | |
| JP | 2001-253936 A | 9/2001 | | |
| JP | 2001253936 A * | 9/2001 | | C08G 61/08 |
| JP | 2003-14901 A | 1/2003 | | |
| JP | 2004-74633 A | 3/2004 | | |
| WO | WO-01/72870 A1 | 10/2001 | | |
| WO | WO 03/000764 A2 | 1/2003 | | |
| WO | WO 2004/003052 A1 | 1/2004 | | |
| WO | WO 2007/091551 A1 * | 8/2007 | | C08L 65/00 |

* cited by examiner

PROCESS FOR CONTINUOUS PRODUCTION OF CYCLOOLEFIN RESINS, AND SHEETS OR FILMS THEREOF, USING RING OPENING METATHESIS POLYMERIZATION

TECHNICAL FIELD

The present invention relates to a process for producing a cycloolefin resin film comprising preparing a polymerizable composition by mixing a cycloolefin monomer with a metathesis polymerization catalyst, coating or impregnating the supporting body with the polymerizable composition, and polymerizing the cycloolefin monomer by continuous bulk polymerization at once, and to a process for producing a polymer sheet or film with the thickness of 1 mm or less comprising polymerizing a reactive solution containing a cycloolefin monomer and a ruthenium complex catalyst by ring-opening metathesis bulk polymerization.

BACKGROUND ART

Since polymers of cycloolefin monomers such as norbornene and dicyclopentadiene have low water absorptivity, low dielectric characteristics, excellent mechanical properties, and the like, application as a film in electric and electronic fields utilizing these advantages is expected.

As a method for obtaining films of the polymer of cycloolefin monomers, there are a number of reports on the approach of forming films from a non-crosslinked cycloolefin polymer which is soluble in solvents and can be molded by thermofusion.

For example, Japanese Patent Application Laid-open No. H6(1994)-298956 discloses a method of producing a linear cycloolefin polymer excelling in thermoplastic formability and forming the polymer by drawing. However, since the process requires a step of drawing the linear polymer after producing the polymer, the method is not necessarily advantageous from the viewpoint of productive efficiency.

Japanese Patent Applications Laid-open No. H5 (1993)-70655, No. H5(1993)-148413, No. H10(1998)-101907, and the like disclose a method of dissolving a linear cycloolefin polymer and casting the polymer solution. This method has an advantage of using existing film production equipment and technology, but requires a step of removing the solvent after applying the solution of linear polymer since a large amount of solvent is used. Moreover, when used as an electric insulation material, the films manufactured by this method may cause problems due to residual solvent such as copper foil peeling, blistering by gas generation, and the like.

Japanese Patent Application Laid-open No. 2001-253934 discloses a method of obtaining a crosslinked resin film by polymerizing a liquid mixture containing a metathesis polymerization catalyst and cycloolefins polymerizable by metathesis polymerization on a carrier. However, since the resulting resin film is a crosslinked resin film, adhesion strength with other materials such as a metallic foil, a substrate, and the like, sometimes is inadequate when the film is laminated with the other materials.

Japanese Patent Applications Laid-open No. 2000-327756 and No. 2001-253934 disclose a method of producing a norbornene resin film by ring-opening metathesis bulk polymerization of norbornene monomers using a ruthenium or osmium complex as a metathesis polymerization catalyst. In this method, after polymerizing the reactive solution containing the norbornene monomers and metathesis polymerization catalyst by ring-opening metathesis bulk polymerization at a prescribed temperature, the mixture is further heated to complete the polymerization and curing. However, the methods disclosed in these documents have a problem of poor production efficiency due to the requirement for controlling the heating rate to below a certain fixed rate.

WO 01/72870 discloses a method of obtaining a formed product of colorless norbornene resin by bulk polymerization of norbornene monomers containing a polymer modifier in the presence of a ruthenium catalyst. The patent specification indicates that a conventional method of bulk polymerization in the presence of a polymer modifier produces a phase-separated structure in the polymer, which results in whitened formed products and that this problem is caused by a moderate heating rate during the polymerization. The patent specification describes that a certain type of ruthenium catalyst can maintain the maximum heating rate to 20° C./sec or more due to the heat of reaction generated during the polymerization, thereby preventing whitening of the formed product.

DISCLOSURE OF THE INVENTION

The present invention has been completed in view of the above situation in the prior art technology. A first object of the present invention is to provide a process for producing a cycloolefin resin film excelling in adhesion to substrates at a high production efficiency.

A second object of the present invention is to provide a process for efficiently producing a polymer sheet or film of cycloolefin polymer with the thickness of 1 mm or less by polymerizing a reactive solution containing a specific ruthenium complex catalyst and a cycloolefin monomer by bulk polymerization.

The inventors of the present invention have conducted extensive studies to achieve the above objects and found that a cycloolefin resin film with excellent adhesiveness can be efficiently produced by preparing a polymerizable composition by mixing a cycloolefin monomer with a metathesis polymerization catalyst, coating the polymerizable composition onto a supporting body or impregnating the supporting body with the polymerizable composition at once, and heating the supporting body to a prescribed temperature to polymerize the polymerizable composition by bulk polymerization. The inventors have further conducted extensive studies on the method for efficiently producing a sheet or film of cycloolefin polymer by ring-opening metathesis bulk polymerization of a reactive solution containing a cycloolefin monomer. As a result, the inventors have found that to obtain a sheet or film of cycloolefin polymer with the thickness of 1 mm or less by ring-opening metathesis bulk polymerization of the above-mentioned reactive solution, a process of rapidly rising the reaction temperature to a prescribed level using a ruthenium complex catalyst having a hetero atom-containing carbene compound as a ligand can ensure a high polymerization conversion ratio and efficiently produce the desired cycloolefin polymer sheet or film.

According to the first invention, the following processes (1)-(9) for producing a cycloolefin resin film are provided.

(1) A process for producing a cycloolefin resin film comprising the steps of: the step (I) of mixing a cycloolefin monomer and a metathesis polymerization catalyst to prepare a polymerizable composition (A); the step (II) of coating or impregnating the supporting body with the polymerizable composition (A) at once after the step (I); and the step (III) of polymerizing the polymerizable composition (A) by bulk polymerization.

(2) The process according to (1), wherein the step (II) is carried out after the step (I) within the pot life of the polymerizable composition (A).

(3) The process according to (1) or (2), wherein the step (I) is a step of preparing the polymerizable composition (A) by mixing the cycloolefin monomer, the metathesis polymerization catalyst, and a chain transfer agent.

(4) The process according to any one of (1) to (3), wherein the step (I) is a step of preparing the polymerizable composition (A) by mixing the cycloolefin monomer, the metathesis polymerization catalyst, and a crosslinking agent.

(5) The process according to any one of (1) to (4), wherein the step (III) is a step of heating the supporting body coated or impregnated with the polymerizable composition (A) to a prescribed temperature using a heating roll, heating plate, or heating oven to polymerize the polymerizable composition (A) by bulk polymerization.

(6) The process according to any one of (1) to (5), wherein a norbornene monomer is used as the cycloolefin monomer.

(7) The process according to any one of (1) to (6), wherein the bulk polymerization is carried out by heating the polymerizable composition (A) to a prescribed temperature of 100° C. or higher at the heating rate of 20° C./min or more, using a ruthenium complex, having a hetero atom-containing carbene compound as a ligand, as the metathesis polymerization catalyst.

(8) The process according to any one of (1) to (7), wherein a metallic foil is used as the supporting body.

(9) The process according to any one of (1) to (7), wherein a fiber material is used as the supporting body.

According to the second invention, the following processes (10)-(14) for producing a cycloolefin polymer sheet or film are provided.

(10) A process for producing a cycloolefin polymer sheet or film with the thickness of 1 mm or less comprising polymerizing a reactive solution containing a ruthenium complex catalyst, having a hetero atom-containing carbene compound as a ligand, and a cycloolefin monomer by ring-opening metathesis bulk polymerization, wherein the polymerization of the cycloolefin monomer is completed by heating the reactive solution to 100° C. or higher at the heating rate of 20° C./min or more.

(11) The process according to (10), wherein the reactive solution further comprises a chain transfer agent.

(12) The process according to (10) or (11), wherein a supporting body is coated or impregnated with the reactive solution, which is polymerized by ring-opening bulk polymerization.

(13) The process according to (12), wherein the supporting body is made of a conductive material.

(14) The process according to (12), wherein the supporting body is made of a fiber material.

BEST MODE FOR CARRYING OUT THE INVENTION

The process for producing a cycloolefin resin film and the process for producing a cycloolefin polymer sheet or film of the present invention will now be described in detail.

1) Process for Producing Cycloolefin Resin Film

The process for producing a cycloolefin resin film comprising the steps of: the step (I) of mixing a cycloolefin monomer and a metathesis polymerization catalyst to prepare a polymerizable composition (A); the step (II) of coating or impregnating the supporting body with the polymerizable composition (A) at once after the step (I); and the step (III) of polymerizing the polymerizable composition (A) by bulk polymerization.

The term "at once" in the present invention refers to "performing the step (II) promptly after preparing the polymerizable composition in the step (I)." In a preferred embodiment of the process for producing a cycloolefin resin film of the present invention, the step (III) is also continuously implemented without delay.

Each step will now be described.

Step (I)

The step (I) is a step for preparing the polymerizable composition (A) by mixing a cycloolefin monomer with a metathesis polymerization catalyst.

As the cycloolefin monomer used in the present invention, a monocycloolefin monomer, a norbornene monomer, and the like can be given. These cycloolefin monomers may be used either individually or in combination of two or more. When two or more cycloolefin monomers are used, it is possible to control the glass transition temperature and melt temperature of the resulting resin by adjusting the mixing ratio. These cycloolefin monomers may be substituted with a hydrocarbon group such as an alkyl group, alkenyl group, alkylidene group, or aryl group, or a polar group.

Of these, norbornene-based monomers (referred to as "norbornene monomers" in the present specification) are particularly preferable in the present invention. The amount of norbornene monomers is preferably 60 wt % or more, more preferably 80 wt % or more of the total amount of cycloolefin monomers. The norbornene monomers may have a double bond other than the double bond of the norbornene ring.

As the monocyclic olefin, a cyclic monoolefin or cyclic diolefin having usually 4-20, and preferably 4-10 carbon atoms can be given. Specific examples of the cyclic monoolefin include cyclobutene, cyclopentene, methylcyclopentene, cyclohexene, methylcyclohexene, cycloheptene, and cyclooctene. Specific examples of the cyclic diolefin include cyclohexadiene, methylcyclohexadiene, cyclooctadiene, methylcyclooctadiene, and phenylcyclooctadiene.

As the norbornene monomer, substituted or unsubstituted, bicyclic, tricyclic, or polycyclic norbornenes can be given. As specific examples of the norbornene monomers, bicyclic norbornenes which may possess a functional group, such as norbornene, norbornadiene, methyl norbornene, dimethyl norbornene, ethyl norbornene, chlorine substituted norbornene, ethylidene norbornene, chloromethyl norbornene, trimethylsilyl norbornene, phenyl norbornene, cyano norbornene, dicyano norbornene, methoxycarbonyl norbornene, pyridyl norbornene, nadic anhydride, and nadic acid imide; tricyclic norbornenes such as dicyclopentadiene or dihydrodicyclopentadiene, and derivatives of these compounds substituted with an alkyl group, alkenyl group, alkylidene group, aryl group, hydroxyl group, acid-anhydride group, carboxyl group, alkoxycarbonyl group, or the like; tetracyclic norbornenes such as dimethanohexahydronaphthalene (tetracyclo[6.2.1.1$^{3,6}$.0$^{2,7}$]dodeca-4,9-diene), dimethanooctahydronaphthalene (tetracyclo[6.2.1.1$^{3,6}$.0$^{2,7}$]dodeca-4-ene), and 1,4-methano-1,4,4a,9a-tetrahydro-9H-fluorene (tetracyclo[9.2.1.0$^{2,10}$.0$^{3,8}$]tetradeca-3,5,7,12-tetraene), and derivatives of these compounds substituted with an alkyl group, alkenyl group, alkylidene group, aryl group, hydroxyl group, acid-anhydride group, carboxyl group, alkoxycarbonyl group or the like, pentacyclic norbornenes such as tricyclopentadiene; hexacyclic norbornenes such as hexacycloheptadecene; compounds containing norbornene rings such as dinorbornene, compounds in which two norbornene rings are bonded via a hydrocarbon group or an ester group, and derivatives of these compounds substituted with an alkyl group or aryl group and the like can be given.

Of the above monomers, when an epoxy compound is used as the crosslinking agent, norbornene monomers having a carboxyl group or an acid-anhydride group as the norbornene monomer are preferably used due to efficient production of a crosslinked resin. The content of the norbornene monomer having a carboxyl group or an acid-anhydride group in the total amount of cycloolefin monomers is preferably 1 mol % or more, and more preferably 5 mol % or more.

There are no specific limitations to the metathesis polymerization catalyst used in the present invention inasmuch as the catalyst can polymerize the cycloolefin monomers by the metathesis ring-opening polymerization. For example, ring-opening metathesis reaction catalysts described in Olefin Metathesis and Metathesis Polymerization (K. J. Ivin and J. C. Mol, Academic Press, San Diego, 1997) may be used.

As the metathesis polymerization catalyst that can be used, a complex formed from a plurality of ions, atoms, polyatomic ions and/or compounds, bonded to a transition metal atom as the center atom can be given. As the transition metal atom, the atoms of groups V, VI, and VIII (in a long-period form of the Periodic Table, hereinafter the same) can be used. Although there are no specific limitations to the atoms belonging to each group, examples include tantalum as the group V atom, molybdenum and tungsten as the group VI atom, and ruthenium and osmium as the group VIII atom.

Of these, ruthenium and osmium of the group VIII metals are preferable as the complex for the metathesis polymerization catalyst, with a ruthenium-carbene complex being particularly preferred. The ruthenium-carbene complex exhibits high productivity of the resin film due to excellent catalytic activity during the bulk polymerization. In addition, since the catalyst is comparatively stable and is not easily deactivated in oxygen or moisture in the air, the thermoplastic resin can be manufactured under atmospheric conditions using the catalyst.

The ruthenium-carbene complex is a compound represented by the following formulas (1) or (2).

(1)

(2)

wherein $R^1$ and $R^2$ individually represent a hydrogen atom, a halogen atom, or a hydrocarbon group having 1-20 carbon atoms which may contain a halogen atom, oxygen atom, nitrogen atom, sulfur atom, phosphorus atom, or silicon atom, preferably at least either one of $R^1$ and $R^2$ being a hetero atom-containing carbene compound, $X^1$ and $X^2$ individually represent an anionic ligand, and $L^1$ and $L^2$ individually represent a hetero atom-containing carbene compound or a neutral electron-donor compound. $R^1$, $R^2$, $X^1$, $X^2$, $L^1$, and $L^2$ groups may bond together in any optional combination to form a multidentate chelated ligand.

The anionic ligands $X^1$ and $X^2$ are ligands taking a negative charge when separated from the central metal. Examples of the ligands include halogen atoms such as a fluorine atom, chlorine atom, bromine atom, or iodine atom; a diketonate group, substituted cyclopentadienyl group, alkoxyl group, aryloxyl group, or carboxyl group, and the like. Of these, halogen atoms are preferable, and a chlorine atom is more preferable.

Specific examples of the hetero atom include N, O, P, S, As, and Se. Of these, N, O, P, S, and the like are preferable, and N is particularly preferable, because a stable carbene compound can be obtained.

A hetero atom-containing carbene compound having hetero atoms bonding to both sides of the carbene carbon atom is preferable, with a carbene compound having a hetero ring which includes a carbene carbon atom and hetero atoms on both sides of the carbon atom being more preferable. It is desirable that hetero atoms adjacent to the carbene carbon atom have a bulky substituent.

As examples of such hetero atom containing carbene compounds, compounds shown by the following formulas (3) and (4) can be given:

(3)

(4)

wherein $R^3$ to $R^6$ individually represent a hydrogen atom, a halogen atom, or a hydrocarbon group having 1-20 carbon atoms which may contain a halogen atom, oxygen atom, nitrogen atom, sulfur atom, phosphorus atom, or silicon atom. $R^3$ to $R^6$ may be bonded together in any optional combination to form a ring.

Specific examples of the compound of the formula (3) or (4) include 1,3-dimesitylimidazolidin-2-ylidene, 1,3-di(1-adamantyl)imidazolidin-2-ylidene, 1-cyclohexyl-3-mesityl-imidazolidin-2-ylidene, 1,3-dimesityloctahydrobenzimidazol-2-ylidene, 1,3-diisopropyl-4-imidazolin-2-ylidene, 1,3-di(1-phenylethyl)-4-imidazolin-2-ylidene, and 1,3-dimesityl-2,3-dihydrobenzimidazol-2-ylidene.

In addition to the compounds represented by the above formula (3) or (4), other hetero atom containing carbene compounds such as 1,3,4-triphenyl-2,3,4,5-tetrahydro-1H-1,2,4-triazol-5-ylidene, 1,3-dicyclohexylhexahydropyrimidin-2-ylidene, N,N,N',N'-tetraisopropylformamidinilidene, 1,3,4-triphenyl-4,5-dihydro-1H-1,2,4-triazol-5-ylidene, and 3-(2,6-diisopropylphenyl)-2,3-dihydrothiazol-2-ylidene can be used.

In the above formulas (1) and (2), the anionic ligands $X^1$ and $X^2$ are ligands having a negative charge when separated from the central metal. Examples of the ligands include halogen atoms such as a fluorine atom, chlorine atom, bromine atom, and iodine atom; a diketonate group, substituted cyclopentadienyl group, alkoxyl group, aryloxyl group, and carboxyl group. Of these, halogen atoms are preferable, and a chlorine atom is more preferable.

A neutral electron-donor compound may be any ligand indicating a neutral charge when separated from the central metal. Specific examples include carbonyls, amines, pyridines, ethers, nitrites, esters, phosphines, thioethers, aromatic compounds, olefins, isocyanides, and thiocyanates. Of these, phosphines, ethers, and pyridines are preferable, and trialkylphosphine is more preferable.

Examples of the ruthenium complex of the formula (1) include ruthenium complex compounds in which a hetero atom-containing carbene compound and a neutral electron-donating compound are bonded such as benzylidene(1,3-dimesitylimidazolidin-2-ylidene)(tricyclohexylphosphine)ruthenium dichloride, (1,3-dimesitylimidazolidin-2-ylidene)(3-methyl-2-buten-1-ylidene) (tricyclopentylphosphine) ruthenium dichloride, benzylidene(1,3-dimesityl-octahydrobenzimidazol-2-ylidene) (tricyclohexylphosphine) ruthenium dichloride, benzylidene[1,3-di(1-phenylethyl)-4-imidazolin-2-ylidene](tricyclohexylphosphine)ruthenium dichloride, benzylidene(1,3-dimesityl-2,3-dihydrobenzimidazol-2-ylidene)(tricyclohexylphosphine) ruthenium dichloride, benzylidene(tricyclohexylphosphine) (1,3,4-triphenyl-2,3,4,5-tetrahydro-1H-1,2,4-triazol-5-ylidene)ruthenium dichloride, (1,3-diisopropylhexahydropyrimidin-2-ylidene)(ethoxymethylene) (tricyclohexylphosphine)ruthenium dichloride, benzylidene(1,3-dimesitylimidazolidin-2-ylidene)pyridineruthenium dichloride, (1,3-dimetylimidazolidin-2-ylidene)(2-phenylethylidene)(tricyclohexylphosphine) ruthenium dichloride, and (1,3-dimesityl-4-imidazolin-2-ylidene)(2-phenylethylidene) (tricyclohexylphosphine)ruthenium dichloride; ruthenium compounds in which two neutral electron-donor compounds are bonded such as benzylidenebis(tricyclohexylphosphine) ruthenium dichloride and (3-methyl-2-buten-1-ylidene)bis (tricyclopentylphosphine)ruthenium dichloride; and ruthenium complex compounds in which two hetero atom-containing carbene compounds are bonded such as benzylidenebis(1,3-dicyclohexylimidazolidin-2-ylidene)ruthenium dichloride and benzylidenebis(1,3-diisopropyl-4-imidazolin-2-ylidene)ruthenium dichloride.

Examples of the ruthenium complex of the formula (2) include (1,3-dimesitylimidazolidin-2-ylidene)(phenylvinylidene)(tricyclohexylphosphine) ruthenium dichloride, (t-butylvinylidene)(1,3-diisopropyl-4-imidazolin-2-ylidene)(tricyclopentylphosphine)ruthenium dichloride, and bis(1,3-dicyclohexyl-4-imidazolin-2-ylidene)phenylvinylideneruthenium dichloride.

These ruthenium complex catalysts can be produced by the methods described in Org. Lett., 1999, Vol. 1, p. 953 and Tetrahedron Lett., 1999, Vol. 40, p. 2247, for example.

The metathesis polymerization catalyst is used at a molar ratio of the metal atoms in the catalyst to the cycloolefins of 1:2,000 to 1:2,000,000, preferably 1:5,000 to 1:1,000,000, and more preferably 1:10,000 to 1:500,000.

If necessary, the metathesis polymerization catalyst may be used dissolved in a small amount of inert solvent. Examples of the solvent include acyclic aliphatic hydrocarbons such as n-pentane, n-hexane, and n-heptane; alicyclic hydrocarbons such as cyclopentane, cyclohexane, methylcyclohexane, dimethylcyclohexane, trimethylcyclohexane, ethylcyclohexane, decahydronaphthalene, bicycloheptane, tricyclodecane, hexahydroindene, and cyclooctane; aromatic hydrocarbons such as benzene, toluene, and xylene; nitrogen-containing hydrocarbons such as nitromethane, nitrobenzene, and acetonitrile; and ethers such as diethyl ether and tetrahydrofuran. Of these, common industrial solvents such as aromatic hydrocarbons, aliphatic hydrocarbons, and alicyclic hydrocarbons are preferably used. In addition, an antioxidant, plasticizer, or elastomer which is in liquid state may be used as a solvent to the extent not reducing the activity of the metathesis polymerization catalyst.

In the present invention, an activator (co-catalyst) may be used in combination with the metathesis polymerization catalyst to control the polymerization activity or to increase the polymerization conversion ratio.

As the activator, an alkyl compound, a halide, an alkoxy compound, an aryloxy compound, and the like of aluminum, scandium, tin, titanium, or zirconium can be given.

Specific examples of the activator include trialkoxy aluminum, triphenoxy aluminum, dialkoxyalkyl aluminum, alkoxydialkyl aluminum, trialkyl aluminum, dialkoxy aluminum chloride, alkoxyalkyl aluminum chloride, dialkyl aluminum chloride, trialkoxy scandium, tetraalkoxy titanium, tetraalkoxy tin, and tetraalkoxy zirconium.

The activator is used at a molar ratio of the metal atoms in the metathesis polymerization catalyst to the activator of 1:0.05 to 1:100, preferably 1:0.2 to 1:20, and more preferably 1:0.5 to 1:10.

When the complex of a transition metal atom of Group V or Group VI is used as a metathesis polymerization catalyst, it is desirable that both the metathesis polymerization catalyst and the activator are dissolved in the monomers. However, it is possible to dissolve or suspend the metathesis polymerization catalyst and activator in a small amount of solvent to the extent that properties of the resulting products are not substantially impaired.

The polymerizable composition (A) can be prepared by mixing a cycloolefin monomer with a metathesis polymerization catalyst. To produce a thermoplastic cycloolefin resin in the present invention, the polymerizable composition (A) is preferably prepared by mixing a chain transfer agent in addition to the cycloolefin monomer and metathesis polymerization catalyst.

As the chain transfer agent, an olefin with a chain structure which may have a substituent, for example, can be used. Specific examples of the chain transfer agent include aliphatic olefins such as 1-hexene and 2-hexene; aromatic olefins such as styrene, divinylbenzene, and stilbene; alicyclic olefins such as vinyl cyclohexane; vinyl ethers such as ethyl vinyl ether; vinyl ketones such as methyl vinyl ketone, 1,5-hexadien-3-on, 2-methyl-1,5-hexadien-3-on; compounds represented by the formula $CH_2=CH-Q$, wherein Q is a group which has at least one group selected from the group consisting of a methacryloyl group, acryloyl group, vinyl silyl group, epoxy group, and amino group. These chain transfer agents may be used either individually or in combination of two or more.

Of these, compounds represented by the formula $CH_2=CH-Q$ are preferable, because the group Q is introduced into the polymer terminals and contributes to the post-crosslinking of the polymer, thereby increasing the crosslinking density.

As specific examples of the compound shown by the formula $CH_2=CH-Q$, compounds in which the Q is a group having a methacryloyl group such as vinyl methacrylate, allyl methacrylate, 3-buten-1-yl methacrylate, 3-buten-2-yl methacrylate, and styryl methacrylate; compounds in which the Q is a group having an acryloyl group such as allyl acrylate, 3-buten-1-yl acrylate, 3-buten-2-yl acrylate, 1-methyl-3- buten-2-yl acrylate, styryl acrylate, and ethylene glycol diacrylate; compounds in which the Q is a group having a vinyl silyl group such as allyl trivinyl silane, allyl methyl divinyl silane, and allyl dimethyl vinyl silane; compounds in which Q is a group having an epoxy group such as glycidyl acrylate and allyl glycidyl ether; compounds in which Q is a group having an amino group such as allyl amine, 2-(diethylamino) ethanol vinyl ether, 2-(diethylamino)ethyl acrylate, 4-vinylaniline; and the like can be given.

The amount of the chain transfer agent to be added is usually 0.01-10 parts by weight, and preferably 0.1-5 parts by weight for 100 parts by weight of the cycloolefin monomer. The amount of the chain transfer agent in this range ensures a high polymerization conversion ratio and efficient production of post-crosslinkable thermoplastic resin.

In addition to the cycloolefin monomer and metathesis polymerization catalyst, a crosslinking agent may also be preferably added and mixed in preparing the polymerizable composition (A).

The crosslinking agent is a compound which can produce a crosslinked resin by a crosslinking reaction with the functional group of the thermoplastic cycloolefin resin. As examples of the functional group, a carbon-carbon double bond, carboxylic acid group, acid anhydride group, hydroxyl group, amino group, active halogen atom, epoxy group, and the like can be given.

As examples of the crosslinking agent that can be used, a radical generating agent, epoxy compound, isocyanate group-containing compound, carboxyl group-containing compound, acid anhydride group-containing compound, amino-group containing compound, Lewis acid, and the like can be given. These crosslinking agents may be used either individually or in combination of two or more. Among these, a radical generating agent or an epoxy compound is preferable.

As examples of the radical generating agent, organic peroxides and diazo compounds can be given. There are no specific limitations to the organic peroxide. For example, ketone peroxides such as methyl ethyl ketone peroxide, methyl isobutyl ketone peroxide, cyclohexanone peroxide, methyl cyclohexanone peroxide, and 3,3,5-trimethylcyclohexanone peroxide; acyl peroxides such as acetyl peroxide, propionyl peroxide, isobutyl peroxide, octanoyl peroxide, 3,5,5-trimethylhexanoyldecanoyl peroxide, lauroyl peroxide, benzoyl peroxide, 4-methylbenzoyl peroxide, 4-chlorobenzoyl peroxide, 2,4-dichlorobenzoyl peroxide, and acetylcyclohexanesulfonyl peroxide; hydroperoxides such as tert-butyl hydroperoxide, cumene hydroperoxide, diisopropylbenzene hydroperoxide, p-methane hydroperoxide, 2,5-dimethylhexane-2,5-dihydroperoxide, and 1,1,3,3-tetramethylbutyl hydroperoxide; dialkyl peroxides such as di-tert-butyl peroxide, tert-butylcumyl peroxide, and dicumyl peroxide; peroxy ketals such as 1,1-bis(t-butylperoxydiisopropyl)benzene, 1,1-bis(t-butylperoxy)-3,5,5-trimethylcyclohexane, and n-butyl-4,4'-bis(tert-butylperoxy)butane; alkyl peresters such as tert-butylperoxy acetate, tert-butylperoxy iso-butyrate, tert-butylperoxy octoate, tert-butylperoxy pivalate, tert-butylperoxy neodecanate, tert-butylperoxy-3,5, 5-trimethylhexanoate, tert-butylperoxybenzoate, di-tert-butylperoxy phthalate, tert-butylperoxy iso-phthalate, tert-butylperoxy laurate, 2,5-dimethyl-2,5-dibenzoylperoxy hexane; peroxy carbonates such as di-2-ethylhexylperoxy dicarbonate, diisopropylperoxy dicarbonate, di-sec-butylperoxy carbonate, di-n-propylperoxy dicarbonate, dimethoxyisopropylperoxy dicarbonate, di-3-methoxybutylperoxy dicarbonate, di-2-ethoxyethylperoxy dicarbonate, and bis(4-tert-butylcyclohexyl)peroxy dicarbonate; water-soluble peroxides such as succinic acid peroxide; alkylsilyl peroxides such as t-butyltrimethylsilyl peroxide; and the like can be given. Examples of the diazo compound include 4,4'-bisazidobenzal(4-methyl)cyclohexanone, 4,4'-diazidochalcone, 2,6-bis(4'-azidobenzal)cyclohexanone, 2,6-bis(4'-azidobenzal)-4-methylcyclohexanone, 4,4'-diazidodiphenylsulfone, 4,4'-diazidodiphenylmethane, 2,2'-diazidostilbene, and the like. Of these, dialkyl peroxides are preferable due to a small hindrance to the metathesis polymerization reaction.

As the epoxy compound, compounds having two or more epoxy groups in the molecule, for example, a phenol novolak epoxy compound, cresol novolak epoxy compound, and cresol epoxy compound; glycidyl ether-type epoxy compounds such as bisphenol A epoxy compound, bisphenol F epoxy compound, brominated bisphenol A epoxy compound, brominated bisphenol F epoxy compound, and hydrogenated bisphenol A epoxy compound; polyvalent epoxy compounds such as an alicyclic epoxy compound, glycidyl ester epoxy compound, glycidyl amine epoxy compound, and isocyanurate epoxy compound; and the like can be given.

As the isocyanate group-containing compound, compounds having two or more isocyanate groups in the molecule such as p-phenylene diisocyanate can be given.

As the carboxyl group-containing compound, compounds having two or more carboxyl groups in the molecule such as fumaric acid can be given.

As examples of the acid anhydride group-containing compound, phthalic anhydride, pyromellitic acid anhydride, and the like can be given.

As the amino group-containing compound, compounds having two or more amino groups in the molecule such as aliphatic diamines, aliphatic polyamines, aromatic diamines, and the like can be given.

As the Lewis acid, silicon tetrachloride, hydrochloric acid, sulfuric acid, ferric chloride, aluminum chloride, stannic chloride, titanium tetrachloride, and the like can be given.

In the present invention, different appropriate crosslinking agents can be used according to the crosslinking sites of the thermoplastic cycloolefin resin. For example, when the polymer molecules are crosslinked at the carbon-carbon double bond, a radical generating agent can be used. When the thermoplastic resin having a carboxyl group or an acid-anhydride group is crosslinked, an epoxy compound can be used. When the thermoplastic resin having a hydroxyl group is crosslinked, a compound having an isocyanate group can be used. When the thermoplastic resin having an epoxy group is crosslinked, a compound having a carboxyl group or an acid-anhydride group can be used. In addition, Lewis acid can also be used as a crosslinking agent for cationically crosslinking the molecules.

There are no specific limitations to the amount of the crosslinking agent. Such an amount can be appropriately determined according to the kind of crosslinking agent used. When a radical generating agent is used as a crosslinking agent, the amount of crosslinking agent used is usually 0.1-10 parts by weight, and preferably 0.5-5 parts by weight for 100 parts by weight of the cycloolefin monomers. When an epoxy compound is used as a crosslinking agent, the amount of crosslinking agent used is usually 1-100 parts by weight, and preferably 5-50 parts by weight for 100 parts by weight of the cycloolefin monomers.

In the present invention, a crosslinking co-agent can be used in combination to improve the crosslinking effect. As the crosslinking co-agent, known crosslinking co-agents, for example, dioxime compounds such as p-quinone dioxime, methacrylate compounds such as lauryl methacrylate, compounds having two or more allyl groups such as diallyl fumarate, diallyl phthalate, and triallyl cyanulate, imide compounds such as maleimide, and the like can be given.

Although there are no specific limitations, the amount of crosslinking co-agent used is usually 0-100 parts by weight, and preferably 0-50 parts by weight for 100 parts by weight of the cycloolefin monomers.

When a radical generating agent is used as a crosslinking agent in the present invention, it is preferable to add a retarder for radical crosslinking to the polymerizable composition (A). The retarder for radical crosslinking is a compound generally having a radical capture function and exhibits the effect of delaying the radical crosslinking reaction caused by a radical generating agent. Flowability of the thermoplastic resin when laminating the resin and storage stability of the thermoplastic resin can be improved by adding a retarder for radical crosslinking to the polymerizable composition (A).

As examples of the retarder for radical crosslinking, alkoxy phenols such as 4-methoxy phenol, 4-ethoxy phenol, 4-methoxy-2-t-butylphenol, 4-methoxy-3-t-butylphenol, and 4-methoxy-2,6-di-t-butylphenol; hydroquinones such as hydroquinone, 2-methylhydroquinone, 2,5-dimethylhydroquinone, 2-t-butylhydroquinone, 2,5-di-t-butylhydroquinone, 2,5-di-t-amylhydroquinone, 2,5-bis(1,1-dimethylbutyl)hydroquinone, and 2,5-bis(1,1,3,3-tetramethylbutyl) hydroquinone; catechols such as catechol, 4-t-butylcatechol, and 3,5-di-t-butylcatechol; and benzoquinones such as benzoquinone, naphthoquinone, and methylbenzoquinone can be given. Of these, alkoxy phenols, catechols, and benzoquinones are preferable, with alkoxy phenols being particularly preferable.

The amount of the retarder for radical crosslinking is usually 0.001-1 mol, and preferably 0.01-1 mol for 1 mol of radical generating agent.

Various additives may be added to the polymerizable composition (A) for improving film properties, providing the film with functions, improving formability, and the like according to the application and purpose of use. Such additives include, for example, fillers, reforming materials, defoaming agents, foaming agents, coloring agents, UV absorbers, photostabilizers, antioxidants, flame retardants, and the like. These additives may be dissolved or dispersed beforehand in the cycloolefin monomer (hereinafter referred to from time to time as "monomer solution") or in the solution or dispersion of the metathesis polymerization catalyst (hereinafter referred to from time to time as "catalyst solution").

The amount of these additives is usually 0.001-500 parts by weight for 100 parts by weight of the cycloolefin monomer.

In addition, a reaction retarder may be added to the polymerizable composition (A) to prevent an increase in the viscosity before polymerization.

As the reaction retarder that can be used, a linear or cyclic compound having a 1,3-diene structure or 1,3,5-triene structure can be given. Of these, the cyclic compound can be a monomer for the reaction and, at the same time, functions as a reaction retarder. Moreover, a Lewis base such as phosphines, aniline, and the like can be used as a reaction retarder.

The amount of the reaction retarder to be added is usually 0.001-5 parts by weight, and preferably 0.002-2 parts by weight for 100 parts by weight of the cycloolefin monomer. If the amount of the reaction retarder is less than 0.001 parts by weight, the reaction retarding effect is not exhibited. If the amount is more than 5 parts by weight, on the other hand, the product properties may be impaired due to the reaction retarder which remains in the polymer. There is also a possibility that the polymerization reaction may not sufficiently proceed.

Although there are no specific limitations to the method for preparing a polymerizable composition (A), a method of separately preparing a monomer solution and a catalyst solution and mixing them just before the reaction can be given, for example. The chain transfer agent, crosslinking agent, crosslinking retarder, and other additives may be added either to the monomer solution or the catalyst solution. Alternatively, these components may be added to the polymerizable composition (A) which is obtained by mixing the monomer solution and the catalyst solution.

The monomer solution and catalyst solution are usually mixed at 0-50° C., and preferably at 10-30° C.

To ensure a high production efficiency and consistent product quality, it is desirable in the present invention to continuously prepare the polymerizable composition (A) by continuously mixing the monomer solution and the catalyst solution. To continuously prepare the polymerizable composition (A), the monomer solution and the catalyst solution are respectively fed to a mixer using a metering pump.

There are no specific limitations to the metering pump insofar as the pump can measure the quantity of feed. A gear pump, diaphragm pump, tube pump, rotary pump, axial plunger pump, cylinder pump, and the like can be given as examples. There are no specific limitations to the mixer. For example, a static mixer, dynamic mixer, impingement mixer, and the like can be used. A common stirrer may also be used as the mixer. Of these, the impingement mixer is preferable due to the high productivity of the polymerizable composition (A). When using an impingement mixer, a method of mixing three or more liquids is preferable. Specifically, the monomer solution is divided into two portions, which are caused to impinge on each other, thereby generating impinging energy. The monomer solution is mixed with the catalyst solution using the generated impinging energy.

Step (II)

The step (II) is a step for coating a supporting body with the polymerizable composition (A) prepared in the step (I) or impregnating the supporting body with the polymerizable composition (A).

In the present invention, the step (II) is carried out continuously and at once after the step (I). Specifically, the polymerizable composition (A) prepared in the step (I) is continuously and at once (without causing the polymerizable composition to be retained after preparation) fed from the mixer for coating or impregnating the supporting body. If the polymerizable composition (A) is caused to be retained after preparation (for example, in a batch system reactor), the polymerization reaction proceeds to change the viscosity of the polymerizable composition (A). As a result, there may be the case in which a homogeneous cycloolefin resin film cannot be obtained.

The period of time $t_1$ from the time when the monomer solution and catalyst solution is mixed in a mixer to the time when the polymerizable composition is coated to or impregnated in the supporting body is usually less than the pot life of the polymerizable composition (A), which is also referred to as pot life and indicates the period of time from the start of mixing the monomer solution and catalyst solution to the time when the mixture is gelatinized and loses fluidity. The time $t^1$ is preferably 60% or less, more preferably 10% or less, still preferably 1% or less, and particularly preferably 0.1% or less of the pot life.

The pot life can be determined according to the method of JIS K6901, section 4.8, provided that the measuring temperature is the temperature of the polymerizable composition (A) in the step (I). The shorter the time $t_1$, the more precise the film thickness and the better the impregnation performance when the supporting body is impregnated with the polymerizable composition (A). A polymer may adhere to the surface of the wall in the passage in which the polymerizable composition (A) flows. The amount of adhesion decreases as the period $t_1$ shortens.

Since the supporting body can be continuously coated or impregnated with the polymerizable composition (A) having fluidity according to the process of the present invention, a resin film excelling in adhesion with the supporting body or a cycloolefin resin homogeneously impregnated a fiber material with a film form can be obtained.

As the supporting body that can be used, a metallic foil, resin support film, fiber material, metal drum, steel belt, fluorin resin belt, and the like can be given. Of these, the metallic foil, resin support film, and fiber material are preferable.

As specific examples of the metallic foil, a copper foil, aluminum foil, nickel foil, chromium foil, gold foil, silver foil, and the like can be given. Of these, the copper foil is preferable. There are no specific limitations to the type of copper foil insofar as the copper foil can be used as a copper clad laminate. The thickness and roughness can be appropriately selected.

The surface of the metallic foil may be treated with a silane coupling agent, a thiol coupling agent, a titanate coupling agent, various adhesives, and the like. Of these, the metallic foil treated with a silane coupling agent of the formula (5), RSiXYZ, or a thiol coupling agent of the formula (6), $T(SH)_n$, is preferable.

In the silane coupling agent of the formula (5), R represents a group having a double bond, a mercapto bond, or an amino group at the terminal, X and Y individually represents a hydrolyzable group, a hydroxyl group, or an alkyl group, and Z represents a hydrolyzable group or a hydroxyl group.

As specific examples of silane coupling agent of the formula (5), allyltrimethoxysilane, styryltrimethoxysilane, N-β-(N-(vinylbenzyl)aminoethyl)-γ-aminopropyltrimethoxysilane and its salt, vinyltris(2-methoxyethoxy)silane, δ-methacryloxybutyltrimethoxysilane, γ-mercaptopropyltrimethoxysilane, N-β-(aminoethyl)-γ-aminopropyltrimethoxysilane, and the like can be given.

In the thiol coupling agent shown by the formula (6), T represents an aromatic ring, an aliphatic ring, a heterocycle, or an aliphatic chain, and n is an integer of 2 or more.

As examples of the thiol coupling agent of the formula (6), 2,4,6-trimercapto-1,3,5-triazine, 2,4-dimercapto-6-dibutylamino-1,3,5-triazine, 2,4-dimercapto-6-anilino-1,3,5-triazine, and the like can be given.

As specific examples of the resin supporting film, a polyethyleneterephthalate film, polypropylene film, polyethylene film, polycarbonate film, polyethylenenaphthalate film, polyallylate film, nylon film, polytetrafluoroethylene film, and the like can be given.

Although there are no specific limitations to the thickness of these metallic foils and resin supporting films, the thickness is usually 1-150 μm, preferably 2-100 μm, and more preferably 3-75 μm, from the viewpoint of workability and the like.

As the fiber material, any known fiber materials, including organic and/or inorganic fibers, can be used without specific limitations. As specific examples of the fiber material, glass fiber, carbon fiber, aramid fiber, polyethyleneterephthalate fiber, vinylon fiber, polyester fiber, amide fiber, metal fiber, ceramic fiber, and the like can be given. These fiber materials may be used either individually or in combination of two or more. As the form of the fiber materials, a mat, cloth, non-woven fabric, and the like can be given.

There are no specific limitations to the method of coating or impregnating the supporting body with the polymerizable composition (A). Known coating methods such as a spray-coating method, dip-coating method, roll-coating method, curtain coating method, die coating method, slit coating method, and atomizing method using supersonic wave can be used. These methods can produce smooth films with a precise thickness.

Any conventionally known devices which can coat the supporting body with the polymerizable composition (A) can be used without any specific limitations. Coating devices described in Japanese Patent Applications Laid-open No. H1(1989)-198639, No. H8(1996)-134235, and No. H8(1996)-174549 can be given as specific examples.

When a fiber material is used as the supporting body, the supporting body can be impregnated with the polymerizable composition (A) by applying a prescribed amount of the polymerizable composition (A) to the fiber material, layering a protective film over the fiber material, as required, and pressing the layered materials with a roll or the like.

There are no specific limitations to the amount of the polymerizable composition (A) with which the supporting body is coated or impregnated. Such an amount can be appropriately determined according to the thickness of the desired resin film. The coating or impregnating temperature of the polymerizable composition (A) is usually 0-80° C. If the coating or impregnating temperature is too high, the polymerizable composition (A) can not be uniformly applied because the polymerization reaction may start during the coating or impregnating operation.

Step (III)

The step (III) is a step for bulk polymerizing the polymerizable composition (A) by heating the supporting body coated or impregnated with the polymerizable composition (A) to a prescribed temperature. In the present invention, the step (III) is preferably carried out continuously and at once after the step (II).

Although there are no specific limitations to the method for heating the supporting body coated or impregnated with the polymerizable composition (A), a method of using a heating roll, a heating plate, or a heating oven is preferable. The method using these heating instruments ensures efficient and continuous production of cycloolefin resin films with excellent smoothness and a precise thickness by bulk polymerization of the polymerizable composition (A).

The method of using a heating roll specifically comprises layering a protective film over the surface of the supporting body coated or impregnated with the polymerizable composition (A), as required, and heat-pressing the layered material using a heating roll. Heat-press using a heating roll ensures bulk polymerization of the polymerizable composition (A) to produce a cycloolefin resin.

As the protective film, any films having releasability from the cycloolefin resin can be used without any specific limitations. For example, a polyethyleneterephthalate film, polypropylene film, polyethylene film, polycarbonate film, polyethylenenaphthalate film, polyallylate film, nylon film, polytetrafluoroethylene film, and the like can be given.

The method of using a heating plate specifically comprises placing the supporting body coated or impregnated with the polymerizable composition (A) onto a plate and heating the plate to obtain a cycloolefin resin by bulk polymerization of the polymerizable composition (A).

The method of using a heating oven specifically comprises placing the supporting body coated or impregnated with the polymerizable composition (A) in a heating oven and heating the entire supporting body in the heating oven to obtain a cycloolefin resin by bulk polymerization of the polymerizable composition (A).

A long cycloolefin resin film with a supporting body can be continuously produced in any of the above methods by using a long supporting body. The resulting cycloolefin resin film with a long supporting body can be rolled up, stored, and transported.

The polymerization reaction temperature is usually 100-300° C., preferably 100-250° C., more preferably 120-250° C., and still more preferably 140-250° C. If the maximum of the reaction temperature is set higher, a crosslinked resin film can be obtained, because not only polymerization reaction but also crosslinking reaction proceeds.

Polymerization of the polymerizable composition (A) without adding a chain transfer agent is preferable for obtaining a crosslinked resin film, because a crosslinked resin film with a higher crosslinking density can be obtained in the absence of the chain transfer agent. A combined use of a fiber material and a metallic foil as a supporting body for obtaining a crosslinked resin film is preferable to ensure excellent productivity, because it is possible to manufacture a metal clad laminate without preparing a prepreg.

On the other hand, to produce a post-crosslinkable thermoplastic resin film, it is necessary to control the peak temperature of the bulk polymerization at lower than 200° C. preferably. Here, "post-crosslinkable" refers to the state of a resin film which is crosslinked to produce a crosslinked resin by heating and melting. In this instance, when a radical generating agent is used as the crosslinking agent, it is preferable to control the peak temperature of the bulk polymerization to the one-minute half-life temperature or less of the radical generating agent. Here, "one-minute half-life temperature" is a temperature at which a radical generating agent is decomposed and reduced to half the original amount in one minute. For example, the one minute half-life temperature of di-t-butylperoxide is 186° C. and that of 2,5-dimethyl-2,5-bis(t-butylperoxy)-3-hexine is 194° C.

In the present invention, when a ruthenium complex compound having a hetero atom-containing carbene compound as a ligand is used as the metathesis polymerization catalyst, it is preferable to polymerize the polymerizable composition (A) by bulk polymerization by heating to 100° C. or higher at the heating rate of 20° C./min or more, and preferably 50° C./min or more. This ruthenium complex compound has high catalytic activity and exhibits significant temperature dependency in the metathesis polymerization reaction. Therefore, if the bulk polymerization is carried out by heating the polymerizable composition (A) to 100° C. or higher at a high heating rate, a high polymerization conversion ratio can be achieved in a very short time.

Since the bulk polymerization has almost completed in the resin, the resulting resin film contains only a very small amount of residual monomers. The high polymerization conversion ratio results in a resin without odor due to residual monomers, thus ensuring a good working environment. In addition, since the bulk polymerization (metathesis ring-opening polymerization) does not continue during storage, the product has excellent storage stability.

Dissolution of the resin produced by bulk polymerization in a solvent confirms that the resin is a thermoplastic resin. Specifically, a resin is a thermoplastic resin if dissolved in a solvent and a crosslinked resin if not dissolved in a solvent. As examples of the solvent, aromatic hydrocarbons such as benzene and toluene; ethers such as diethyl ether and tetrahydrofuran; and halogenated hydrocarbons such as dichloromethane and chloroform can be given.

The polymerization conversion ratio of the thermoplastic resin can be determined by dissolving the thermoplastic resin in toluene and analyzing the resulting solution using a known analytical means such as gas chromatography, for example. The polymerization conversion ratio of the resulting thermoplastic resin is usually 80% or more, more preferably 90% or more, and still more preferably 95% or more. The resulting thermoplastic resin film may not be entirely post-crosslinkable, but it is sufficient that at least the surface area of the thermoplastic resin film is post-crosslinkable.

The production process of the present invention can be suitably applied to the production of a cycloolefin resin film with a thickness of 2 mm or less, preferably 1 mm or less, more preferably 0.5 mm or less, and still more preferably 0.1 mm or less.

When the cycloolefin resin film obtained by the process of the present invention is a thermoplastic resin film, the resin excels in fluidity and adhesion. For this reason, if the thermoplastic resin is laminated with a substrate and crosslinked, a crosslinked resin composite material excelling in flatness and consisting of a crosslinked resin firmly adhering to the substrate can be obtained.

When a supporting resin film is used as the supporting body, the obtained thermoplastic resin film may be laminated with a substrate after separating from the supporting resin film. As the substrate used here, a metallic foil, a conductive polymer film, other thermoplastic resin films and boards, and the like can be given.

When a metallic foil, a metallic clad laminate for outer layers, or a metallic clad laminate for inner layers are used as the substrates, these substrates may be layered with the thermoplastic resin film between stainless plates and the layered materials may be press-heated to crosslink the thermoplastic resin portion to obtain a crosslinked resin-metal clad laminate or a crosslinked resin-interconnecting substrate.

When a metallic foil is used as the supporting body, a crosslinked resin-metal clad laminate can be obtained by crosslinking the thermoplastic resin portion of the resulting resin-attached metallic foil.

For example, when a copper foil is used as a substrate, the resulting crosslinked resin-copper clad laminate consists of the crosslinked cycloolefin resin firmly adhering to the substrate. This is an ideal material as an electric material such as a printed circuit board. The peel-off strength of the copper foil measured according to JIS C6481 is preferably 0.8 kN/m or more, and more preferably 1.2 kN/m or more.

The temperature for crosslinking the thermoplastic resin is usually 170-250° C., and preferably 180-220° C. Although there are no specific limitations, the time for crosslinking the resin is usually from several minutes to several hours.

2) Process for Producing Cycloolefin Polymer Sheet or Film

The second invention provides a process for producing a cycloolefin polymer sheet or film with the thickness of 1 mm or less comprising polymerizing a reactive solution containing a ruthenium complex catalyst, having a hetero atom-containing carbene compound as a ligand, and a cycloolefin monomer by ring-opening metathesis bulk polymerization, wherein the polymerization of the cycloolefin monomer is completed by heating the reactive solution to 100° C. or higher at the heating rate of 20° C./min or more.

Ruthenium Complex Catalyst

The ruthenium complex catalyst used in the present invention is a ruthenium complex compound having a hetero atom-containing carbene compound as a ligand. This ruthenium complex catalyst is excellent in catalytic activity in bulk polymerization. Therefore, the catalyst exhibits excellent productivity of cycloolefin polymer sheets or films. The resulting polymer sheets or films also exhibit excellent productivity, with no odors originating from unreacted cycloolefin monomers.

The ruthenium complex catalyst having a hetero atom-containing carbene compound as a ligand (hereinafter referred to from time to time as "ruthenium complex catalyst") is one ruthenium complex having ruthenium as a central metal, which is bonded with a hetero atom-containing carbene compound. The catalyst thus has a structure in which the ruthenium metal atom directly bonds with the carbene carbon atom.

The compounds shown by the above-mentioned formulas (1) or (2) can be given as specific examples of the ruthenium complex compound. In the above-mentioned formulas (1) and (2), at least one of $L^1$ and $L^2$ is a hetero atom-containing carbene compound.

The ruthenium complex catalyst is used at a molar ratio of the ruthenium atoms in the catalyst to the cycloolefin monomers of 1:2,000 to 1:2,000,000, preferably 1:5,000 to 1:1,000,000, and more preferably 1:10,000 to 1:500,000.

If necessary, the ruthenium complex catalyst may be used dissolved in a small amount of inert solvent. As the solvent, the same solvents mentioned above as the solvent used for dissolving the metathesis polymerization catalyst can be given.

An activator (co-catalyst) may be used in combination with the ruthenium complex catalyst to control the polymerization activity or to increase the polymerization conversion ratio. As the activator, an alkyl compound, a halide, an alkoxy compound, an aryloxy compound, and the like of aluminum, scandium, tin, titanium, or zirconium can be given. The activator is used at a molar ratio of the ruthenium atoms in the catalyst to the activator of 1:0.05 to 1:100, preferably 1:0.2 to 1:20, and more preferably 1:0.5 to 1:10.

Cycloolefin Monomer

As the cycloolefin monomer used in the present invention, a monocycloolefin monomer, a norbornene monomer, and the like can be given. These cycloolefin monomers may be used either individually or in combination of two or more. When two or more cycloolefin monomers are used, it is possible to control the glass transition temperature and melt temperature of the resulting resin by adjusting the mixing ratio. These cycloolefin monomers may be substituted with a hydrocarbon group such as an alkyl group, alkenyl group, alkylidene group, or aryl group, or a polar group.

Of these, norbornene-based monomers (referred to as "norbornene monomers" in the present specification) are particularly preferable in the present invention. The amount of norbornene monomers is preferably 60 wt % or more, more preferably 80 wt % or more of the total amount of cycloolefin monomers. The norbornene monomers may have a double bond other than the double bond of the norbornene ring.

As the monocyclic cycloolefin monomer and norbornene monomer, the monomers mentioned in the production process of cycloolefin resin film in the first invention can be given.

Of the monomers mentioned previously, when an epoxy compound is used as the crosslinking agent, norbornene monomers having a carboxyl group or an acid-anhydride group as the norbornene monomer are preferably used due to easy production of a crosslinked resin. The content of the norbornene monomer having a carboxyl group or an acid-anhydride group in the total amount of cycloolefin monomers is preferably 1 mol % or more, and more preferably 5 mol % or more.

Reactive Solution

The reactive solution used in the present invention is a solution containing the ruthenium complex catalyst and cycloolefin monomer which were mentioned above.

Although there are no specific limitations to the method of preparing the reactive solution, a method of separately preparing cycloolefin monomer solutions and a catalyst solution in which a ruthenium complex catalyst is dissolved or dispersed in a suitable solvent, and combining the monomer solutions and catalyst solution at once before polymerization can be given as an example.

The monomer solution and catalyst solution are mixed usually at −20° C. to +50° C., and preferably at 0° C. to 30° C.

In the present invention, when production of a thermoplastic cycloolefin polymer (thermoplastic resin) is desired, it is preferable to add a chain transfer agent to the above-mentioned reactive solution.

As the chain transfer agent, those mentioned in the production process for cycloolefin resin film in the first invention can be given.

The amount of the chain transfer agent to be added is usually 0.01-10 parts by weight, and preferably 0.1-5 parts by weight for 100 parts by weight of the cycloolefin monomer. The amount of the chain transfer agent in this range ensures a high polymerization conversion ratio and efficient production of thermoplastic resin.

A crosslinking agent may also be added to the reactive solution. The crosslinking agent can produce a crosslinked resin by the crosslinking reaction with the functional group of the thermoplastic cycloolefin resin.

As examples of the functional group, a carbon-carbon double bond, carboxylic acid group, acid anhydride group, hydroxyl group, amino group, active halogen atom, epoxy group, and the like can be given.

As examples of the crosslinking agent that can be used, a radical generating agent, epoxy compound, isocyanate group-containing compound, carboxyl group-containing compound, acid anhydride group-containing compound, amino-group containing compound, Lewis acid, and the like can be given. As specific examples, those mentioned in the production process for cycloolefin resin film in the first invention can be given. These crosslinking agents may be used either individually or in combination of two or more.

There are no specific limitations to the amount of the crosslinking agent. Such an amount can be appropriately determined according to the kind of the crosslinking agent used. When a radical generating agent is used as a crosslinking agent, the amount of the crosslinking agent used is usually 0.1-10 parts by weight, and preferably 0.5-5 parts by weight for 100 parts by weight of the cycloolefin monomers. When an epoxy compound is used as a crosslinking agent, the amount of the crosslinking agent used is usually 1-100 parts by weight, and preferably 5-50 parts by weight for 100 parts by weight of the cycloolefin monomers.

When using a crosslinking agent, a crosslinking co-agent can be used together to increase the effect of the crosslinking agent. As the crosslinking co-agent, those mentioned in the production process for cycloolefin resin film in the first invention can be given.

Although there are no specific limitations, the amount of the crosslinking co-agent used is usually 0-100 parts by weight, and preferably 0-50 parts by weight for 100 parts by weight of the cycloolefin monomers.

In case of using a radical generating agent as a crosslinking agent, it is preferable to add a retarder for radical crosslinking to the reactive solution. The retarder for radical crosslinking is a compound generally having a radical capture function and exhibits the effect of delaying the radical crosslinking reaction caused by a radical generating agent. Flowability of the thermoplastic resin when laminating the resin and storage stability of the thermoplastic resin can be improved by adding a retarder for radical crosslinking to the reactive solution.

As the retarder for radical crosslinking, those mentioned in the production process for cycloolefin resin film in the first invention can be given.

The amount of the retarder for radical crosslinking is usually 0.001-1 mol, and preferably 0.01-1 mol for 1 mol of radical generating agent.

The addition of the reaction retarder to the reactive solution can prevent a viscosity increase before the reactive solution is polymerized.

As the reaction retarder, those mentioned in the production process for cycloolefin resin film in the first invention can be given.

The amount of the reaction retarder to be added is usually 0.0001-5 parts by weight, and preferably 0.001-2 parts by weight for 100 parts by weight of the cycloolefin monomer. If the amount of the reaction retarder is less than 0.0001 parts by weight, the reaction retarding effect is not exhibited. If the amount is more than 5 parts by weight, on the other hand, the product properties may be impaired due to the reaction retarder which remains in the polymer. There is also a possibility that the polymerization reaction may not sufficiently proceed.

Various additives may be added to the reactive solution for improving properties of sheets and films, providing the sheets or films with functions, improving formability, and the like according to the application and purpose of use.

Such additives include, for example, fillers, reforming materials, defoaming agents, foaming agents, coloring agents, an UV absorbers, photostabilizers, antioxidants, flame retardants, and the like.

The amount of these additives is usually 0.001-500 parts by weight for 100 parts by weight of the cycloolefin monomer.

The chain transfer agent, crosslinking agent, crosslinking retarder, and other additives may be added either to the monomer solution or the catalyst solution. Alternatively, these components may be added to a reactive solution obtained by mixing the monomer solution and the catalyst solution.

Ring-Opening Bulk Polymerization

The reactive solution prepared in the above-described manner is heated to a prescribed temperature (cured) to polymerize the reactive solution by ring-opening bulk polymerization, thereby obtaining the cycloolefin polymer sheets or films. The curing temperature is usually from 100-300° C., and preferably from 100-250° C.

The present invention has a step of heating the reactive solution to 100° C. or above at the heating rate of 20° C./min or more, preferably 50° C./min or more to complete the polymerization of cycloolefin monomers. If the heating rate is less than 20° C./min, production of sheets or films with a thickness of 1 mm or less is difficult, because the polymerization heat of reaction is lost by thermal diffusion, and resulting in a decrease of catalytic activity and the polymerization conversion ratio. The catalytic activity is increased and high polymerization conversion ratio can be achieved by using a ruthenium complex catalyst having a hetero atom-containing carbene compound as a ligand as a metathesis polymerization catalyst and by rapidly heating the reaction system. According to the process of the present invention, cycloolefin polymer sheets or films can be efficiently produced at a high polymerization conversion ratio by sufficiently increasing the catalytic activity of the ruthenium complex catalyst.

In the present invention, it is preferable to cause the supporting body to be coated or impregnated with the reactive solution at once after preparation. The period of time from preparation of the reactive solution through the time when the reactive solution is fed to the mold or the supporting body is coated or impregnated with the reactive solution is preferably within the pot life of the reactive solution, and more preferably 60% or less of the pot life.

There are no specific limitations to the method for obtaining a formed sheet or film with a thickness of 1 mm or less by ring-opening bulk polymerization of the reactive solution. For example, (i) a method of charging a mold heated to a prescribed temperature with the reactive solution to polymerize by ring-opening bulk polymerization and (ii) a method of causing the supporting body to be coated or impregnated with the reactive solution and heating to a prescribed temperature to polymerize by ring-opening bulk polymerization, and the like can be given. Of these, the method (ii) is more preferable due to its capability of efficiently producing a polymer sheet or film with a thickness of 1 mm or less.

There are no specific limitations to the mold used in the method (i). A common mold for forming sheets that can produce formed products in the shape of a sheet or film can be used. For example, a mold for forming a sheet may be comprised of two sheets of stainless plate and face-plate heaters applied to the stainless plates, sandwiched by a U-shaped spacer.

The temperature of the mold when charged with the reactive solution is usually from −20° C. to +80° C. The mold is then heated to 100° C. or higher, and preferably to 150° C. or higher, by the face-plate heater provided in the mold at the heating rate of 20° C./min or more, and preferably 50° C./min or more, to complete the ring-opening bulk polymerization of the reactive solution, thereby obtaining the desired cycloolefin polymer sheet or film.

As examples of the supporting body used in the method (ii), a conductive material; fiber material; resin supporting film such as a polyethyleneterephthalate film, polypropylene film, polyethylene film, polycarbonate film, polyethylenenaphthalate film, polyallylate film, nylon film, polytetrafluoroethylene film; a fluororesin belt; and the like can be given. Of these, the conductive material and fiber material are preferable when the cycloolefin polymer sheet or film of the present invention is used as an electric material.

As the conductive material, metals such as copper, nickel, aluminum, iron, tin, chromium, silver, gold, palladium, tungsten, and alloys of two or more of these metals, as well as conductive polymers can be used. Metals are more preferable.

There are no specific limitations to the form of the metal material. A liquid metal and a solid metal in the form of a drum, a belt, or thin film (metallic foil) may be used. Of these, metallic foils such as a copper foil, aluminum foil, nickel foil, chromium foil, gold foil, silver foil, and the like are preferable. There are no specific limitations to the type of metallic foil insofar as the metallic foil can be used as a metal clad laminate. The thickness and roughness can be appropriately selected. Although there are no specific limitations to the thickness of the conductive material, the thickness is usually 1-150 μm, preferably 2-100 μm, and more preferably 3-75 μm, from the viewpoint of workability and the like. When a conductive material is used as the supporting body, a cycloolefin polymer sheet or film with a conductive layer can be obtained. For example, when a metallic foil is used as a conductive material, a resin attached-metallic foil can be obtained.

The surface of the metallic foil used as the conductive material may be treated with a silane coupling agent, a thiol coupling agent, a titanate coupling agent, various adhesives, and the like. A metallic foil treated with a silane coupling agent of the above formula (5) or a thiol coupling agent of the above formula (6) are particularly preferable.

As the fiber material, either an organic fiber material or inorganic fiber material can be used without any specific limitations. As specific examples of the fiber material, glass fiber, carbon fiber, aramid fiber, polyethyleneterephthalate fiber, vinylon fiber, polyester fiber, amide fiber, metal fiber, ceramic fiber, and the like can be given. These fiber materials may be used either individually or in combination of two or more. As the form of the fiber materials, a mat, cloth, non-woven fabric, and the like can be given. When a fiber material is used as the supporting body, a fiber-reinforced prepreg can be obtained.

There are no specific limitations to the method for coating the supporting body with the reactive solution. The same method as described in the section of the process for producing the cycloolefin resin film of the first invention can be given.

When a fiber material is used as the supporting body, the supporting body can be coated with the reactive solution by applying a prescribed amount of the reactive solution to the fiber material using the above-mentioned coating method, layering a protective film over the fiber material, as required, and pressing the layered materials with a roll or the like.

There are no specific limitations to the amount of the reactive solution with which the supporting body is coated or impregnated. Such an amount can be appropriately determined according to the thickness of the desired polymer sheet or film. The coating or impregnating temperature of the reactive solution is usually from −20° C. to +80° C. If the coating or impregnating temperature is too high, the reactive solution cannot be uniformly applied because the polymerization reaction may start during the coating or impregnating operation.

Although there are no specific limitations to the method for completing the polymerization by heating the reactive solution to 100° C. or higher at the heating rate of 20° C./min or more, a method of using a heating roll, a heating plate, or a heating oven is preferable for heating the reactive solution with which the supporting body is coated or impregnated. Heating by these methods can be carried out in the same manner as the heating method of the supporting body coated or impregnated with the polymerizable composition (A) described above. These methods ensure continuous and efficient production of cycloolefin polymer sheets or films by bulk polymerization of the reactive solution.

A long cycloolefin polymer sheet or film with a supporting body can be continuously produced in any of the above methods by using a long supporting body. The resulting cycloolefin polymer sheet or film with a long supporting body can be rolled up, stored, and transported.

The polymerization conversion ratio of the cycloolefin polymer of the present invention is usually 80% or more, more preferably 90% or more, and still more preferably 95% or more. Since the bulk polymerization has almost completed in the cycloolefin polymer sheet of film, the resulting resin film contains only a very small amount of residual monomers. In other words, since the polymerization conversion ratio is high, the polymer sheet or film does not worsen the work environment due to an odor originating from monomers. In addition, the polymer sheet or film excels in storage stability, because the bulk polymerization does not proceed during storage. Moreover, the polymer sheet or film excels in heat resistance, because lowering of the glass transition temperature of the polymer by plasticizing does not occur without residual monomers.

Either a polymer sheet or film in which the cycloolefin polymer is a thermoplastic resin, or a polymer sheet or film in which the cycloolefin polymer is a crosslinked resin, can be produced by the process of the present invention. Specifically, the polymer sheet or film in which the cycloolefin polymer is a thermoplastic resin can be obtained by bulk polymerization of the reactive solution containing a chain transfer agent, whereas the polymer sheet or film in which the cycloolefin polymer is a crosslinked resin can be obtained by bulk polymerization of the reactive solution containing a crosslinking agent.

Moreover, if the reactive solution containing a crosslinking agent in addition to the chain transfer agent is polymerized by bulk polymerization, a post-crosslinkable thermoplastic cycloolefin polymer sheet or film can be obtained. Thermoplasticity of a cycloolefin polymer can be confirmed by dissolving the cycloolefin polymer sheet or film in a solvent.

To produce a post-crosslinkable thermoplastic sheet or film, it is necessary to control the peak temperature of bulk polymerization preferably at less than 200° C. When a radical generating agent is used as a crosslinking agent, the peak temperature during bulk polymerization should preferably be controlled to the one-minute half-life temperature or less of the radical generating agent.

When the cycloolefin polymer sheet or film is a thermoplastic resin sheet or film, the sheet or film exhibits excellent fluidity and adhesion. A crosslinked resin composite material excelling in flatness and firmly adhering to a substrate can be obtained by laminating the sheet or film with the substrate and crosslinking the thermoplastic resin.

The post-crosslinkable thermoplastic cycloolefin polymer sheet or film is crosslinked usually at 170-250° C., and preferably 180-220° C. Although there are no specific limitations, the crosslinking time is usually from several minutes to several hours.

When a metal plate or a supporting film made of resin is used as the supporting body, cycloolefin polymer sheet or film obtained by separating from the supporting body may be laminated with a substrate. As the substrate used here, a metallic foil, a conductive polymer film, and other thermoplastic resin films and boards can be given.

When a metallic foil, a metal clad laminate for outer layers, or a metal clad laminate for inner layers is used as the substrates, these substrates may be layered with the thermoplastic resin film between stainless plates and the layered materials may be press-heated to crosslink the thermoplastic resin portion to obtain a crosslinked resin-metal clad laminate or a crosslinked resin-interconnecting substrate.

When a metallic foil is used as the supporting body, a crosslinked resin-metal clad laminate can be obtained by crosslinking the thermoplastic resin portion of the resulting resin-attached metallic foil. For example, when a copper foil is used as a substrate, the resulting crosslinked resin-copper clad laminate consists of the cycloolefin resin firmly adhering to the substrate. This is an ideal material as an electric material such as a printed circuit board. The peel-off strength of the copper foil measured according to JIS C6481 is preferably 0.8 kN/m or more, and more preferably 1.2 kN/m or more. Moreover, since the resulting crosslinked resin-copper clad laminate contains only a slight amount of residual solvents and monomers, the product is free from problems such as blistering due to gas generation.

EXAMPLES

The present invention will be described in more detail by way of examples and comparative examples. However, the following examples should not be construed as limiting the present invention. The types and amounts of the catalyst and cycloolefin monomers can be freely changed without departing from the spirit of the present invention.

The pot life was determined by mixing 15 ml of the monomer solution and 0.12 ml of the catalyst solution, and measuring the period of time from the start of mixing to the time when the mixture is gelatinized and looses fluidity. A series of operations was carried out in a nitrogen gas atmosphere and the monomer solution and the catalyst solution were mixed at 25° C.

The glass transition temperature (Tg) of the formed products was measured using a differential scanning calorimeter after heating the sample at the heating rate of 10° C./min. The heating residue was determined as a residual percentage of weight, which was measured using a thermobalance after heating the sample from room temperature to 400° C.

Examples and Comparative Examples of the Invention for Solving the First Subject Example 1

A 100 ml glass flask was charged with 1.1 g of benzylidene (1,3-dimesitylimidazolidin-2-ylidene) (tricyclohexylphosphine)ruthenium dichloride and 1.6 g of triphenylphosphine. 44 g of toluene was added to dissolve the mixture thereby obtaining a catalyst solution 1 with a ruthenium concentration of 0.025 mol/l.

A 1 l eggplant flask was charged with 1.8 g of 4-methoxy-2,6-di-t-butylphenol, 450 g of tetracyclo[$6.2.1.1^{3,6}.0^{2,7}$] dodeca-4-ene, 150 g of 2-norbornene, 15 ml of allyl methacrylate, and 8.6 ml of di-t-butylperoxide to obtain a monomer solution 1. The pot life was confirmed to be 6 minutes using the monomer solution 1 and catalyst solution 1.

A glass cloth-reinforced polytetrafluoroethylene resin film (hereinafter referred to as "glass cloth-reinforced PTFE resin film", thickness: 0.08 mm, Product #5310, manufactured by Saint-Gobain KK) was cut into 150 mm×4100 mm sections. Three sheets of glass cloth, each with a size of 100 mm×4000 mm and a thickness of 0.092 mm (Product #2116/AS891AW, manufactured by Asahi Schwebel Co., Ltd.) were placed on the glass cloth-reinforced PTFE resin film.

Next, a small tube pump was connected to each of the catalyst solution 1 and the monomer solution 1 to feed the solutions to a small static mixer (a spiral type, element length: 3.18 mm, number of elements: 24) at a flow rate respectively of 15 ml/min and 0.12 ml/min. The mixed solution flowing out of the static mixer was fed to one end (start end) of the glass cloth and transferred to other end (terminus) at a transfer rate of 400 mm/min. The same glass cloth-reinforced PTFE resin film as above was covered over the part of the glass cloth to which the mixed solution was fed and pressed using a roll from above to cause the glass cloth to be impregnated with the mixed solution.

Three minutes after the start of feeding of the mixed solution, a heating plate (a 200 mm×200 mm aluminum plate heated to 150° C.) was placed below the glass cloth-reinforced PTFE resin film and caused to come into contact therewith from the start end to heat and cure the mixture. Then, the heating plate was moved from the start end of the glass cloth to the terminus at a speed of 400 mm/min.

Ten minutes after the start of feeding of the mixed solution, impregnation was completed at the terminus of the glass cloth, whereby the mixed solution feeding operation was completed. In addition, 13 minutes after the start of feeding of the mixed solution, the heating plate reached the terminus of the glass cloth, whereby the heating/curing operation was completed. Thereafter, the glass cloth-reinforced PTFE resin films on both sides were removed to obtain a prepreg.

A part of the prepreg was put into a platinum crucible and the resin portion was burnt in an electric heating oven to determine the glass content from the weight of the glass remained after burning. The glass content was found to be 57 wt %. Part of the prepreg was dipped in toluene to dissolve the resin portion. The amount of residual monomers was determined by gas chromatography. The polymerization conversion ratio calculated from the residual monomer amount and the glass content was 97%.

Two drops of acetic acid were added to 60 g of distilled water. After then, 0.18 g of vinyl tris(2-methoxyethoxy)silane (trade name: A-172, manufactured by Nippon Unicar Co., Ltd.) was added to the water solution, and the mixture was stirred for 10 minutes to hydrolyze and dissolve the silane compound. The silane solution was absorbed in absorbent cotton, applied to an electrodeposited copper foil (rough surface treated with GTS, thickness: 0.018 mm, manufactured by Furukawa Circuit Foil Co., Ltd.), and dried at 130° C. for one hour in a nitrogen atmosphere.

Four sheets of the above-mentioned prepreg (each cut into 87 mm×87 mm sections) were put into a square frame with an inner size of 90 mm×90 mm (thickness: 1 mm) and sandwiched with the above silane-treated copper foil (cut into 115 mm×115 mm sections) from both sides so that the rough side faced the prepreg side. The sandwiched material was heat-pressed at 4.1 MPa and 200° C. for 15 minutes. Then, the material was cooled while applying pressure. The sample was removed at a temperature of 100° C., or less, thereby obtaining a double-sided copper clad laminate.

The copper foil peel-off force of the resulting double-sided copper clad laminate was measured according to the method of JIS C6481 to find that the peel-off force was 1.6 kN/m. The solder heat resistance was tested in a solder bath at 260° C. for 20 seconds to confirm that no blistering occurred. The bending test was carried out using the fiber-reinforced resin portion (thickness: 1.5 mm) after peeling the copper foil to confirm that the bending modulus of elasticity was 12 GPa and the bending strength was 386 MPa. The dielectric constant and dielectric loss tangent were measured using an impedance analyzer (E4991, manufactured by Agilent Corp.) to conform that the moldlectric constant and dielectric loss tangent were respectively 3.5 and 0.0013 at 100 MHz and 3.5 and 0.0022 at 1 GHz.

Example 2

A 100 ml glass flask was charged with 4.1 g of benzylidene bistricyclohexylphosphineruthenium dichloride and 5.2 g of triphenylphosphine. 35 g of toluene was added to dissolve the mixture thereby obtaining a catalyst solution 2 with a ruthenium concentration of 0.10 mol/l (a ruthenium complex catalyst which does not have a hetero atom-containing carbene compound as a ligand). The pot life was confirmed to be 3 minutes and 50 seconds using the monomer solution 1 and catalyst solution 2.

A prepreg was prepared in the same manner as in Example 1, except for using the catalyst solution 2 instead of the catalyst solution 1. A long prepreg with dimensions of 4000 mm×100 mm was obtained as in Example 1 without interruption.

Comparative Example 1

Ten sheets of glass cloth-reinforced PTFE resin film (the same film as used in Example 1 cut into 150 mm×500 mm sections) were prepared. Three sheets of glass cloth (the same glass cloth as used in Example 1 cut into 100 mm×400 mm sections) were placed on each of the glass cloth-reinforced PTFE resin films.

A 200 ml beaker was charged with 150 ml of the monomer solution 1 prepared in Example 1 and 1.2 ml of the catalyst solution 2 prepared in Example 2, and the mixture was stirred to obtain a mixed solution. 15 ml of the mixed solution was measured in a syringe and charged onto the glass cloth of the first glass cloth-reinforced PTFE resin film. The glass cloth-reinforced PTFE resin film was then covered with another glass cloth-reinforced PTFE resin film (same type as the first one), which was pressed with a roll to cause the glass cloth to be impregnated with the mixed solution. Then, the product was placed on a heating plate (200 mm×200 mm aluminum plate heated to 150° C.) and heated for one minute to cure the resin. The glass cloth-reinforced PTFE resin film was removed to obtain a prepreg.

The same operation as above was repeated using the same mixed solution to prepare one prepreg per one minute. As a result, it was confirmed that the viscosity of the mixed solution increased over time. Impregnation of the glass cloth with the mixed solution was difficult during preparation of the fourth prepreg. Therefore, preparation of the prepreg was terminated. Three prepregs were obtained.

Example 3

Figure 1:
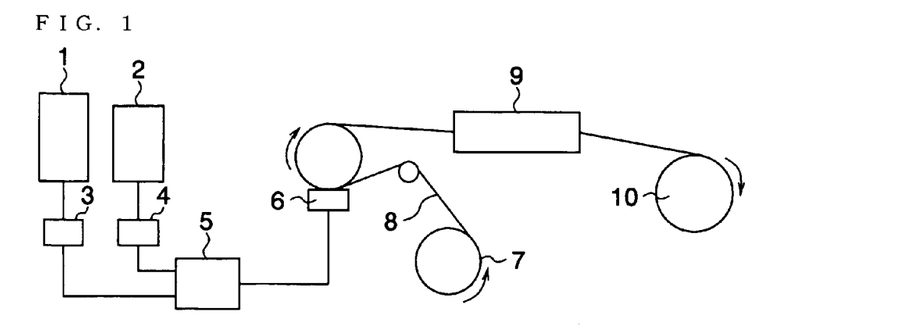
FIG. 1 is a diagram showing an outline of the continuous forming apparatus used in Example 3 for forming a laminate film of a cycloolefin resin film and a supporting film.

The continuous forming apparatus shown in FIG. 1 was used in Example 3. A monomer solution tank 1 was charged with 12 g of fumed silica (AEROSIL 200, manufactured by Japan Aerosil Co.), 450 g of tetracyclo$[6.2.1.1^{3,6}.0^{2,7}]$dodeca-4-ene, 150 g of 2-norbornene, 10 g of styryl methacrylate, and 8.6 g of 1,3-di(2-t-butylperoxyisopropyl)benzene (one-minute half-life temperature: 175° C.). The mixture was stirred to obtain a monomer solution 2. A catalyst solution tank 2 was charged with the catalyst solution 1 obtained in Example 1. The pot life was confirmed to be 5 minutes and 40 seconds using the monomer solution 2 and catalyst solution 1.

Small tube pumps 3 and 4 were connected respectively to the monomer solution tank 1 and the catalyst solution tank 2 to feed the solutions to a small static mixer 5 (the same mixer as used in Example 1) at a flow rate respectively of 15 ml/min and 0.12 ml/min to obtain a mixed solution, which was sent to a coating section 6.

A polyethylenenaphthalate film with a thickness of 75 μm and a width of 100 mm was forwarded from a support film delivery section 7 at a delivery rate of 50 mm/second to the coating section 6, where the supporting film was continuously coated to a coating thickness of 50 μm. The coated supporting film was continuously forwarded to a heating oven 9. In the heating oven 9, the monomer mixture was polymerized and cured by heating at 150° C. for 30 seconds to obtain a film on the supporting film. The film attached to the supporting film was wound around a reel at a film winding section 10.

A part of the film was removed from the supporting film and dipped in toluene to dissolve the resin. The amount of residual monomers in the solution was determined by gas chromatography. Based on the resulting amount of residual monomers, the polymerization conversion ratio was calculated to be 97%.

On the other hand, the film was attached to both sides of a glass epoxy both-side copper clad laminate (thickness: 1 mm, cut into 80 mm×80 mm), which had been microetched using a surface roughener CZ-8100 (MEC Co., Ltd.), and heat-pressed at 5.2 MPa and 200° C. for 15 minutes. After cooling to 100° C. or less while applying pressure, the sample was removed to obtain a both-side copper clad laminate, with the crosslinked resin adhering to the surface. The cross-cut adhesion test according to JIS K5400 was carried out to test adhesion of the resin layer with the inner copper cladding. As a result, there was no peel-off.

Example 4

Figure 2:
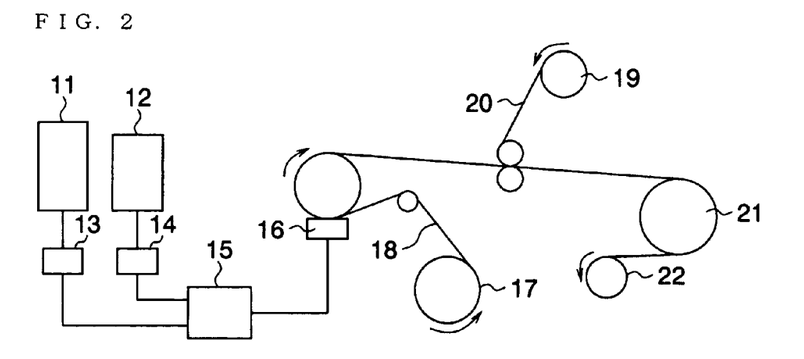
FIG. 2 is a diagram showing an outline of the continuous forming apparatus used in Example 4 for forming a metallic foil with a cycloolefin resin.

The continuous forming apparatus shown in FIG. 2 was used in Example 4. A monomer solution tank 11 was charged with 12 g of fumed silica (AEROSIL 200), 252 g of tetracyclo$[6.2.1.1^{3,6}.0^{2,7}]$dodeca-4-ene, 108 g of 2-norbornene, 240 g of dicyclopentadiene, 5.0 ml of styrene, and 8.6 ml of di-t-butylperoxide (one-minute half-life temperature: 186° C.). The mixture was stirred to obtain a monomer solution 3. A catalyst solution tank 12 was charged with 1.1 g of benzylidene(1,3-dimesityl-4-imidazolin-2-ylidene)(tricyclohexylphosphine)ruthenium dichloride and 1.6 g triphenylphosphine. 44 g of toluene was added to dissolve the mixture thereby obtaining a catalyst solution 3. The pot life was confirmed to be 23 minutes using the monomer solution 3 and catalyst solution 3.

Small tube pumps 13 and 14 were connected respectively to the monomer solution tank 11 and the catalyst solution tank 12 to feed the solutions to a small static mixer 15 (the same mixer as used in Example 1) at a flow rate respectively of 15 ml/min and 0.12 ml/min to obtain a mixed solution, which was sent to a coating section 16.

A continuously extending electrodeposited copper foil 18 (same material as used in Example 1) with a width of 100 mm was forwarded from a copper foil delivery section 17 at a rate of 50 mm/sec so that the rough surface was continuously coated in a coating section 16 to a coating layer thickness of 50 μm. Next, a continuous belt-shaped polyethylenenaphthalate film 20 with a thickness of 75 μm and a width of 100 mm was delivered from a protective film delivery section 19 and layered on the coated surface of the copper foil. The glossy surface of the copper foil was caused to come in contact with a heating roll 21 heated at 160° C. for 15 seconds to complete the polymerization. The resulting resin-attached copper foil was rolled together with the protective film around a resin-attached copper foil winding section 22.

Part of the resin-attached copper foil was removed from the supporting film and dipped in toluene to dissolve the resin portion. The amount of residual monomers in the solution was determined by gas chromatography analysis of the solution. Based on the resulting amount of residual monomers and the remaining amount of copper, the polymerization conversion ratio was calculated to be 96 wt %.

The resin-attached copper foil was attached to both sides of a glass epoxy both-side copper clad laminate (the same material as that used in Example 2), with the resin side being on the inner side, and the resulting material was heat-pressed at 5.2 MPa and 200° C. for 15 minutes. After cooling to 100° C. or less while applying pressure, the sample was removed to obtain a multilayer copper clad laminate.

Example 5

Figure 3:
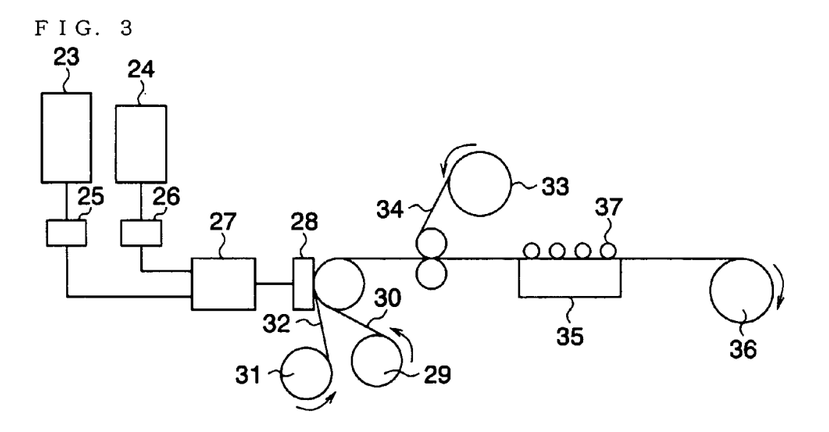
FIG. 3 is a diagram showing an outline of the continuous forming apparatus used in Example 5 for forming a double-sided copper-clad laminate.

The continuous forming apparatus shown in FIG. 3 was used in Example 5. A monomer solution tank 23 was charged with 600 g of tetracyclo$[6.2.1.1^{3,6}.0^{2,7}]$dodeca-4-ene, which was used as a monomer solution 4. A catalyst solution tank 24 was charged with 1.1 g of benzylidene(1,3-dimesitylimidazolidin-4-ylidene) (tricyclohexylphosphine)ruthenium dichloride and 1.6 g triphenylphosphine. 44 g of toluene was added to dissolve the mixture thereby obtaining a catalyst solution 4. The pot life was confirmed to be 5 minutes and 30 seconds using the monomer solution 4 and catalyst solution 4.

Small tube pumps 25 and 26 were connected respectively to the monomer solution tank 23 and the catalyst solution tank 24 to feed the solutions to a small static mixer 27 (the same mixer as used in Example 1) at a flow rate respectively of 25 ml/min and 0.20 ml/min to obtain a mixed solution, which was sent to a coating section 28.

A continuously extending electrodeposited copper foil 30 (same material as used in Example 1) with a width of 100 mm was forwarded from a copper foil delivery section 29 at a rate of 50 mm/sec so that the rough surface was coated. At the same time, a continuously extending glass cloth 32 (same material as used in Example 1) with a width of 100 mm was forwarded from a fiber material delivery section 31 at a rate of 50 mm/sec so that the glass cloth was layered and continuously coated and impregnated with the mixed solution in a coating section 28.

Next, a continuously extending electrodeposited copper foil 34 (the same material 30 above) with a width of 100 mm was delivered from a copper foil delivery section 33 and layered on the glass cloth surface with the rough surface coming in contact with the glass cloth surface. A glossy surface of the copper foil was caused to come in contact with a heating plate 35 heated at 220° C. for 15 seconds and pressed with a press roll 37 to complete the polymerization. The resulting double-sided copper-clad laminate was rolled around a double-sided copper-clad-laminate winding section 36. The solder heat resistance of the double-sided copper-clad-laminate was tested in a solder bath at 260° C. for 20 seconds to confirm that no blistering occurred.

Examples and Comparative Examples of the Invention for Solving the Second Subject Example 6

A 20 ml egg plant flask was charged with 4.2 mg of benzylidene(1,3-dimesitylimidazolidin-2-ylidene) (tricyclohexylphosphine)ruthenium dichloride and 6.6 mg triphenylphosphine. 0.05 ml of toluene was added to dissolve the mixture. 8.1 ml of tetracyclo[$6.2.1.1^{3,6}.0^{2,7}$]dodeca-4-ene (styrene content: 1 mol %) was added to the solution while stirring to prepare a reactive solution 1 (ruthenium concentration: 0.6 mmol/l). As a mold for forming a sheet with dimensions of 0.5 mm×80 mm×80 mm, two sheets of stainless plate with dimensions of 0.25 mm×100 mm×100 mm with a face-plate heater applied were sandwiched by a U-shaped spacer (thickness 0.5 mm). Reactive solution 1 was fed to the mold (the above operation was carried out at room temperature (25° C.)) and the mold was heated to 220° C. at the heating rate of 80° C./min. After cooling, the formed sheet product was removed and subjected to thermal analysis measurement. The Tg of the formed sheet was 201° C. and the heating residue was 97.5%.

It can be seen from the results of Example 6 that when the heating rate is high (80° C./min), the polymerization conversion ratio is high (i.e. the heating residue increases).

Example 7

A glass flask containing a stirring bar was charged with 1.4 mg of benzylidene(1,3-dimesitylimidazolidin-2-ylidene)(tricyclohexylphosphine)ruthenium dichloride and 2.2 mg triphenylphosphine. 0.03 ml of toluene was added to dissolve the mixture, thereby obtaining a catalyst solution. 8.1 ml of tetracyclo[$6.2.1.1^{3,6}.0^{2,7}$]dodeca-4-ene (styrene content: 1 mol %) was added to the catalyst solution while stirring to prepare a reactive solution 2 (ruthenium concentration: 0.2 mmol/l). The reactive solution 2 was applied to a stainless steal plate heated to 220° C. to confirm that the solution was instantaneously solidified. The solid was quickly removed to obtain a polymer film with a thickness of 0.1 mm. The Tg of the polymer film was 205° C. and the heating residue was 98.8%.

Example 8

A catalyst solution was prepared in the same manner as in Example 7, except that triphenylphosphine was not added. 8.0 ml of a 9:1 (weight ratio) mixed solution of dicyclopentadiene and cyclopentadiene trimer was added to the catalyst solution while stirring to prepare a reactive solution 3 (ruthenium concentration: 0.2 mmol/l).

The reactive solution 3 was coated onto a stainless steel plate heated to 180° C. to confirm that the solution was instantaneously solidified. The solid was quickly removed to obtain polymer film with a thickness of 0.1 mm. The Tg of the polymer film was 165° C. and the heating residue was 98.5%.

It can be seen from the results of Examples 7 and 8 that when instantaneously heated, the desired product can be obtained at a high rate of polymerization reaction, even if the amount of catalysts is reduced.

Comparative Example 2

As a mold for forming a sheet with dimensions of 0.5 mm×80 mm×80 mm, two sheets of aluminum plate with dimensions of 10 mm×100 mm×100 mm, with a face-plate heater applied were sandwiched by a U-shaped spacer (thickness 0.5 mm). A sheet was prepared in the same manner as in Example 6 except that the heating rate was 12° C./min.

The Tg of the formed sheet was 164° C. and the heating residue was 93.0%.

Comparative Example 3

A sheet was prepared in the same manner as in Comparative Example 2, except for using the reactive solution 3. The Tg of the formed sheet was 105° C. and the heating residue was 93.5%.

It can be seen from the results of Comparative Examples 2 and 3 that when the heating rate is small (12° C./min), the polymerization conversion ratio is low (i.e. the heating residue decreases).

Reference Example 1

A sheet was prepared in the same manner as in Comparative Example 3, except for using a mold (3 mm×80 mm×80 mm) composed of two sheets of aluminum plate (10 mm×100 mm×100 mm) with a plate heater applied, which are sandwiched by a U-shaped spacer (thickness 3 mm), and the reactive solution was prepared in the same manner as in the reactive solution 1, except for using six times the amount of components used for the reactive solution 1. When the mold temperature reached 61° C., smoke due to the heat of reaction emitted from the top of the mold.

The Tg of the resulting sheet was 202° C. and the heating residue was 98.5%. It can be seen from the results of the experiment in Reference Example 1 that when the mold has a large thickness (3 mm), the temperature rapidly increases due to the heat of reaction. Therefore, the desired product can be obtained at a high rate of polymerization reaction, even if the mold temperature is slowly rised.

Comparative Example 4

The reactive solution 3 was applied to a stainless steel plate heated to 80° C. and reacted for 10 minutes to obtain a polymer film with a thickness of 0.5 mm. The Tg of the polymer film was 80° C. and the heating residue was 88.5%.

It can be seen that when the mold temperature for preparing a film with a thickness of 1 mm or less is 80° C., the heat of reaction is absorbed by the mold and the mold cannot be used to sufficiently cure the resin, resulting in a low polymerization conversion ratio.

Comparative Example 5

A sheet product was prepared in the same manner as in Example 6, except for using 4.1 mg of benzylidene bis(tricyclohexylphosphine)ruthenium dichloride instead of 4.2 mg of benzylidene(1,3-dimesitylimidazolidin-2-ylidene) (tricyclohexylphosphine)ruthenium dichloride. The Tg of the obtained sheet was 145° C. and the heating residue was 91.5%.

Example 9

A catalyst solution was prepared in the same manner as in Example 7 except for using 2.7 mg of triphenylphosphine. 7.0 ml of tetracyclo[$6.2.1.1^{3,6}.0^{2,7}$]dodeca-4-ene (containing 1 mol % of styrene), 3.4 ml of 5-ethylidene-2-norbornene, and 0.079 ml of styrene were added to this catalyst solution and the mixture was stirred to obtain a reactive solution 4.

A copper foil (TYPE GTS, thickness: 0.018 mm, manufactured by Furukawa Circuit Foil Co., Ltd.) was placed on a tray with the rough side up and covered with a sheet of a nonwoven polyamide fiber fabric ("Kepler" manufactured by DuPont de Nemous & Co.). After impregnating the reactive solution 4, a polytetrafluoroethylene sheet (thickness: 0.08 mm) was laid over the nonwoven polyamide fiber fabric.

The resulting laminate was removed from the tray and placed on a chrome-plated iron plate heated at 150° C. with the copper foil down, at once followed by pressing using handy roll (prepared from an aluminum rod with a diameter of 80 mm) heated at 150° C. to cure the resin. A composite consisting of a resin reinforced with polyamide fiber and a copper foil was thus obtained.

INDUSTRIAL APPLICABILITY

A cycloolefin resin film excelling in storage stability and fluidity during heating and lamination can be efficiently produced by continuous forming according to the first invention.

When the cycloolefin resin film obtained by the production process of the present invention is a thermoplastic resin film, a crosslinked resin composite material excelling in adhesion with a substrate can be efficiently produced by layering the thermoplastic resin film with the substrate and causing the thermoplastic resin portion to be heated and melted to crosslink. The crosslinked resin composite material obtained in this manner is composed of the cycloolefin resin which is excellent in electric insulation properties, mechanical strength, heat resistance, adhesion, dielectric properties, and the like, with the substrate firmly adhering to the cycloolefin resin, and is suitably used as an electric material such as a printed circuit board.

According to the second invention, a polymer sheet or film of cycloolefin polymer with the thickness of 1 mm or less can be efficiently produced by ring-opening metathesis bulk polymerization of a reactive solution containing a ruthenium complex catalyst, having a hetero atom-containing carbene compound as a ligand, and a cycloolefin monomer while heating.

The invention claimed is:

1. A process for producing a cycloolefin resin film comprising the steps of:
    the step (I) of mixing a cycloolefin monomer, a ruthenium complex compound having a hetero atom-containing carbene compound as a ligand, a radical generating agent, and a chain transfer agent to prepare a polymerizable composition (A);
    the step (II) of coating or impregnating a supporting body with the polymerizable composition (A) at once after the step (I); and
    the step (III) of polymerizing the polymerizable composition (A) by bulk polymerization,
    wherein the hetero atom-containing carbene compound has a hetero ring which includes a carbon atom and hetero atoms bonding to both sides of the carbene carbon atom,
    wherein the chain transfer agent is one or more selected from the group consisting of aromatic olefins and a compound represented by the formula $CH_2$=CH-Q, wherein Q is a group which has at least one group selected from the group consisting of a methacryloyl group, acryloyl group, vinyl silyl group, epoxy group, and amino group,
    wherein the supporting body is a metallic foil, resin support film, or fiber material, and the fiber material is one or more selected from the group consisting of glass fiber, carbon fiber, aramid fiber, polyethyleneterephthalate fiber, vinylon fiber, polyester fiber, amide fiber, metal fiber, and ceramic fiber;
    wherein the step (III) comprises heating the supporting body coated or impregnated with the polymerizable composition (A) to a prescribed temperature using a heating roll, heating plate, or heating oven to polymerize the polymerizable composition (A) by bulk polymerization,
    wherein the cycloolefin resin film is a post-crosslinkable thermoplastic film or a crosslinked resin film, and
    wherein the step (III) is carried out continuously and at once after the step (II).

2. The process according to claim 1, wherein the step (II) is carried out after the step (I) within the pot life of the polymerizable composition (A).

3. The process according to claim 1, wherein the step (II) is carried out after the step (I) within 60% or less of the pot life of the polymerizable composition (A).

4. The process according to claim 1 or 2, wherein a long cycloolefin resin film is continuously manufactured by using a long supporting body as the supporting body.

5. The process according to claim 1 or 2, wherein both a fiber material and a metallic foil are used as the supporting body to manufacture a metal clad laminate.

6. A process for producing a cycloolefin polymer sheet or film with the thickness of 1 mm or less comprising:
    coating or impregnating a supporting body with a reactive solution containing a ruthenium complex catalyst, having a hetero atom-containing carbene compound as a ligand, a cycloolefin monomer, a radical generating agent, and a chain transfer agent and
    polymerizing the reactive solution by ring-opening metathesis bulk polymerization, wherein the hetero atom-containing carbene compound has a hetero ring which includes a carbon atom and hetero atoms bonding to both sides of the carbene carbon atom, wherein the chain transfer agent is one or more selected from the group consisting of aromatic olefins and a compound represented by the formula $CH_2=CH-Q$, wherein Q is a group which has at least one group selected from the group consisting of a methacryloyl group, acryloyl group, vinyl silyl group, epoxy group, and amino group, wherein the polymerization of the cycloolefin monomer is completed by heating the reactive solution to 100° C. or higher at the heating rate of 20° C./min or more, and wherein the supporting body is made of conductive material, fiber material, or resin supporting film and the fiber material is one or more selected from the group consisting of glass fiber, carbon fiber, aramid fiber, polyethyleneterephthalate fiber, vinylon fiber, polyester fiber, amide fiber, metal fiber, and ceramic fiber.

7. The process according to claim 6, wherein the cycloolefin resin film is a post-crosslinkable thermoplastic film or a crosslinked resin film.

8. A process for producing a cycloolefin resin film, comprising:
a step (I) of mixing a cycloolefin monomer, a ruthenium complex compound having a hetero atom-containing carbene compound as a ligand, a radical generating agent, and a chain transfer agent to prepare a polymerizable composition (A);
a step (II) of coating or impregnating a supporting body with the polymerizable composition (A) at once after the step (I); and
a step (III) of polymerizing the polymerizable composition (A) by bulk polymerization, wherein the hetero atom-containing carbene compound has a hetero ring which includes a carbene carbon atom and hetero atoms bonding to both sides of the carbene carbon atom, and wherein the chain transfer agent is one or more selected from the group consisting of aromatic olefins and a compound represented by the formula $CH_2=CH-Q$, wherein Q is a group which has at least one group selected from the group consisting of a methacryloyl group, acryloyl group, vinyl silyl group, epoxy group, and amino group.

9. A process for producing a cycloolefin polymer sheet or film with a thickness of 1 mm or less, comprising:
polymerizing a reactive solution containing a ruthenium complex catalyst, having a hetero atom-containing carbene compound as a ligand, a radical generating agent, a cycloolefin monomer, and a chain transfer agent by ring-opening metathesis bulk polymerization, wherein the hetero atom-containing carbene compound has a hetero ring which includes a carbene carbon atom and hetero atoms bonding to both sides of the carbene carbon atom, wherein the chain transfer agent is one or more selected from the group consisting of aromatic olefins and a compound represented by the formula $CH_2=CH-Q$, wherein Q is a group which has at least one group selected from the group consisting of a methacryloyl group, acryloyl group, vinyl silyl group, epoxy group, and amino group, and wherein the polymerization of the cycloolefin monomer is completed by heating the reactive solution to 100° C. or higher at the heating rate of 20° C./min or more.

10. The process according to claim 1, 6, 8, or 9, wherein the step (I) comprises preparing the polymerizable composition (A) by further mixing a retarder for radical crosslinking to the polymerizable composition (A).

* * * * *